US012732929B2

(12) United States Patent
Sun et al.

(10) Patent No.: US 12,732,929 B2
(45) Date of Patent: Sep. 8, 2026

(54) APERIODIC SIGNAL TRANSMISSION FOR INITIAL ACCESS

(71) Applicant: QUALCOMM Incorporated, San Diego, CA (US)

(72) Inventors: Jing Sun, San Diego, CA (US); Qingjiang Tian, San Diego, CA (US); Xiaoxia Zhang, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 598 days.

(21) Appl. No.: 17/558,155

(22) Filed: Dec. 21, 2021

(65) Prior Publication Data

US 2023/0199679 A1 Jun. 22, 2023

(51) Int. Cl.
*H04W 56/00* (2009.01)
*H04L 5/00* (2006.01)
*H04W 24/08* (2009.01)

(52) U.S. Cl.
CPC ......... *H04W 56/001* (2013.01); *H04L 5/0051* (2013.01); *H04W 24/08* (2013.01)

(58) Field of Classification Search
CPC .... H04W 56/001; H04W 24/08; H04L 5/0051
USPC .......................................................... 370/503
See application file for complete search history.

(56) References Cited

U.S. PATENT DOCUMENTS 11,483,204 B2 * 10/2022 Lin ..................... H04L 41/0866
2017/0311276 A1 * 10/2017 Tsai .................... H04L 27/2602
2019/0349960 A1 * 11/2019 Li ......................... H04L 5/0055
2020/0008131 A1 * 1/2020 Chakraborty ......... H04W 16/28
2020/0059967 A1 * 2/2020 Kim ...................... H04L 1/0026
2020/0145983 A1 * 5/2020 Levitsky ................. H04L 5/005

(Continued)

OTHER PUBLICATIONS

Futurewei: "Support efficient activation/de-activation mechanism for SCells", 3GPP TSG RAN WG1 Meeting #106bis-e, R1-2108797, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 1, 2021, 13 Pages, XP052057706, Sections 2.3 and 2.4.

(Continued)

*Primary Examiner* — Jasper Kwoh
(74) *Attorney, Agent, or Firm* — QUALCOMM Incorporated

(57) ABSTRACT

Methods, systems, and devices for wireless communications are described. A base station may transmit, to a user equipment (UE), an aperiodic synchronization signal block comprising an indication timing for receipt of an aperiodic remaining system information transmission. The UE may receive the aperiodic synchronization signal block and monitor for the aperiodic remaining system information based on receiving the aperiodic synchronization signal block. The base station may transmit, to the UE, the aperiodic remaining system information comprising an indication of timing for one or more occasions for physical random access channel transmission. The UE may receive the aperiodic remaining system information based on the timing for receipt included in the aperiodic synchronization signal block and select at least one occasion for the physical random access channel transmission based on the timing.

30 Claims, 15 Drawing Sheets

(56) References Cited

U.S. PATENT DOCUMENTS

2020/0252951 A1* 8/2020 Frenne .................. H04L 5/0023
2021/0067205 A1 3/2021 Manolakos et al.
2021/0092627 A1 3/2021 Radulescu et al.
2021/0176687 A1* 6/2021 Ko ...................... H04W 36/249
2021/0289443 A1 9/2021 Nam et al.
2021/0336333 A1 10/2021 Yang et al.
2021/0360510 A1* 11/2021 Zheng ................... H04L 5/0012
2021/0392593 A1 12/2021 Nagarajan et al.

OTHER PUBLICATIONS

International Search Report and Written Opinion—PCT/US2022/052860—ISA/EPO—Apr. 12, 2023.
Nokia., et al., "Discovery and Measurements for IAB", 3GPP TSG RAN WG1 Meeting #95, R1-1812704, IAB Discovery and Measurements, 3rd Generation Partnership Project (3GPP), Mobile Competence Centre, 650, Route Des Lucioles, F-06921 Sophia-Antipolis Cedex, France, vol. RAN WG1, No. Spokane, WA, USA, Nov. 12, 2018-Nov. 16, 2018, Nov. 2, 2018, 5 Pages, XP051478948, Section 2.2.

* cited by examiner

600

800

1000

1400

APERIODIC SIGNAL TRANSMISSION FOR INITIAL ACCESS

FIELD OF TECHNOLOGY

The following relates to wireless communications, including aperiodic signal transmission for initial access.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some examples, base stations may support transmission of synchronization signal blocks for initial access. In some instances, synchronization signal block transmission techniques may be improved.

SUMMARY

The described techniques relate to improved methods, systems, devices, and apparatuses that support aperiodic signal transmission for initial access. Generally, the described techniques provide for a base station to transmit, to a user equipment (UE) and at a determined transmission time, an aperiodic synchronization signal block comprising an indication timing for receipt of an aperiodic remaining system information transmission. In some cases, the aperiodic synchronization signal block may comprise location information for receipt of the aperiodic remaining system information. The UE may receive the aperiodic synchronization signal block and monitor for the aperiodic remaining system information based on receiving the aperiodic synchronization signal block. The base station may transmit, to the UE, the aperiodic remaining system information comprising an indication of timing for one or more occasions for physical random access channel transmission. The UE may receive the aperiodic remaining system information based on the timing for receipt included in the aperiodic synchronization signal block and select at least one occasion for the physical random access channel transmission based on the timing.

A method for wireless communication at a user equipment (UE) is described. The method may include monitoring for one or more synchronization signal blocks from a base station, receiving an aperiodic synchronization signal block based on the monitoring, the aperiodic synchronization signal block including an indication of a timing for receipt of an aperiodic remaining minimum system information transmission, and monitoring for the aperiodic remaining minimum system information transmission based on receiving the aperiodic synchronization signal block.

An apparatus for wireless communication at a UE is described. The apparatus may include a processor, memory coupled with the processor, and instructions stored in the memory. The instructions may be executable by the processor to cause the apparatus to monitor for one or more synchronization signal blocks from a base station, receive an aperiodic synchronization signal block based on the monitoring, the aperiodic synchronization signal block including an indication of a timing for receipt of an aperiodic remaining minimum system information transmission, and monitor for the aperiodic remaining minimum system information transmission based on receiving the aperiodic synchronization signal block.

Another apparatus for wireless communication at a UE is described. The apparatus may include means for monitoring for one or more synchronization signal blocks from a base station, means for receiving an aperiodic synchronization signal block based on the monitoring, the aperiodic synchronization signal block including an indication of a timing for receipt of an aperiodic remaining minimum system information transmission, and means for monitoring for the aperiodic remaining minimum system information transmission based on receiving the aperiodic synchronization signal block.

A non-transitory computer-readable medium storing code for wireless communication at a UE is described. The code may include instructions executable by a processor to monitor for one or more synchronization signal blocks from a base station, receive an aperiodic synchronization signal block based on the monitoring, the aperiodic synchronization signal block including an indication of a timing for receipt of an aperiodic remaining minimum system information transmission, and monitor for the aperiodic remaining minimum system information transmission based on receiving the aperiodic synchronization signal block.

Some examples of the method, apparatuses, and non-transitory computer-readable medium described herein may further include operations, features, means, or instructions for receiving, from the base station, the aperiodic remaining minimum system information based on the timing for receipt of the aperiodic remaining minimum system information included in the aperiodic synchronization signal block, determining that the aperiodic remaining minimum system information includes an indication of timing for one or more occasions for physical random access channel transmission, and selecting at least one occasion for the physical random access channel transmission based on the timing for the one or more occasions for the physical random access channel transmission.

Some examples of the method, apparatuses, and non-transitory computer-readable medium described herein may further include operations, features, means, or instructions for determining that the aperiodic synchronization signal block includes location information for receipt of the aperiodic remaining minimum system information and receiving the aperiodic remaining minimum system information based on the location information for receipt of the aperiodic remaining minimum system information.

In some examples of the method, apparatuses, and non-transitory computer-readable medium described herein, the location information indicates a location for receiving the aperiodic remaining minimum system information with respect to a timing for receipt of the aperiodic synchronization signal block.

Some examples of the method, apparatuses, and non-transitory computer-readable medium described herein may further include operations, features, means, or instructions for receiving a second aperiodic synchronization signal block based on the monitoring, determining that the second aperiodic synchronization signal block lacks timing information for reception of a second aperiodic remaining minimum system information, and refraining from performing a demodulation reference signal scrambling for the second aperiodic remaining minimum system information using the timing information based on the determining.

Some examples of the method, apparatuses, and non-transitory computer-readable medium described herein may further include operations, features, means, or instructions for determining that the aperiodic synchronization signal block includes an indication of a first occasion for reception of the aperiodic remaining minimum system information and a second occasion for reception of a retransmission of the aperiodic remaining minimum system information, where the first occasion and the second occasion may be indicated with respect to a timing for receipt of the aperiodic synchronization signal block, receiving the aperiodic remaining minimum system information based on the indication of the first occasion included in the aperiodic synchronization signal block, and receiving a retransmission of the aperiodic remaining minimum system information based on the indication of the second occasion included in the aperiodic synchronization signal block.

Some examples of the method, apparatuses, and non-transitory computer-readable medium described herein may further include operations, features, means, or instructions for determining that a physical downlink control channel or a physical downlink shared channel associated with the aperiodic remaining minimum system information may be not received at the UE, monitoring for a second aperiodic synchronization signal block based on determining that the physical downlink control channel or the physical downlink shared channel associated with the aperiodic remaining minimum system information may be not received at the UE, receiving the second aperiodic synchronization signal block including an indication of a timing for receipt of a second aperiodic remaining minimum system information, and receiving the second aperiodic remaining minimum system information based on the timing for receipt of the second aperiodic remaining minimum system information included in the second aperiodic synchronization signal block.

Some examples of the method, apparatuses, and non-transitory computer-readable medium described herein may further include operations, features, means, or instructions for receiving, from the base station, a set of multiple aperiodic remaining minimum system information transmissions indicated by the aperiodic synchronization signal block, where the aperiodic synchronization signal block includes an indication of timing for receipt of a set of multiple aperiodic remaining minimum system information transmissions.

Some examples of the method, apparatuses, and non-transitory computer-readable medium described herein may further include operations, features, means, or instructions for determining that the aperiodic remaining minimum system information associated with a first beam indicates a second beam for selecting an occasion for a physical random access channel transmission and selecting the occasion for the physical random access channel transmission based on the determining.

Some examples of the method, apparatuses, and non-transitory computer-readable medium described herein may further include operations, features, means, or instructions for receiving, from a base station, a type indication indicating the aperiodic synchronization signal block, where monitoring for the one or more synchronization signal blocks may be based on the type indication.

In some examples of the method, apparatuses, and non-transitory computer-readable medium described herein, the type indication may be transmitted in a physical broadcast channel transmission or a demodulation reference signal associated with the physical broadcast channel transmission. In some examples of the method, apparatuses, and non-transitory computer-readable medium described herein, the UE uses the aperiodic synchronization signal block to perform an initial access operation.

In some examples of the method, apparatuses, and non-transitory computer-readable medium described herein, the aperiodic synchronization signal block includes a cell defining synchronization signal block. In some examples of the method, apparatuses, and non-transitory computer-readable medium described herein, the aperiodic synchronization signal block and a periodic synchronization signal block may be associated with at least one of different synchronization rasters, different primary synchronization signal sets, different secondary synchronization signal sets, or a combination thereof.

A method for wireless communication at a base station is described. The method may include determining a transmission time for an aperiodic synchronization signal based on one or more parameters and transmitting, to a UE, an aperiodic synchronization signal block at the determined transmission time, the aperiodic synchronization signal block including an indication timing for receipt of an aperiodic remaining minimum system information transmission.

An apparatus for wireless communication at a base station is described. The apparatus may include a processor, memory coupled with the processor, and instructions stored in the memory. The instructions may be executable by the processor to cause the apparatus to determine a transmission time for an aperiodic synchronization signal based on one or more parameters and transmit, to a UE, an aperiodic synchronization signal block at the determined transmission time, the aperiodic synchronization signal block including an indication timing for receipt of an aperiodic remaining minimum system information transmission.

Another apparatus for wireless communication at a base station is described. The apparatus may include means for determining a transmission time for an aperiodic synchronization signal based on one or more parameters and means for transmitting, to a UE, an aperiodic synchronization signal block at the determined transmission time, the aperiodic synchronization signal block including an indication timing for receipt of an aperiodic remaining minimum system information transmission.

A non-transitory computer-readable medium storing code for wireless communication at a base station is described. The code may include instructions executable by a processor to determine a transmission time for an aperiodic synchronization signal based on one or more parameters and transmit, to a UE, an aperiodic synchronization signal block at the determined transmission time, the aperiodic synchronization signal block including an indication timing for receipt of an aperiodic remaining minimum system information transmission.

Some examples of the method, apparatuses, and non-transitory computer-readable medium described herein may further include operations, features, means, or instructions for transmitting, to the UE, the aperiodic remaining minimum system information including an indication of a timing of one or more occasions for physical random access channel transmission and receiving, from the UE, the physical random access channel transmission based on the timing for the one or more occasions for the physical random access channel transmission.

Some examples of the method, apparatuses, and non-transitory computer-readable medium described herein may further include operations, features, means, or instructions for determining that the aperiodic synchronization signal block includes location information for receipt of the aperiodic remaining minimum system information and transmitting the aperiodic remaining minimum system information based on the location information for receipt of the aperiodic remaining minimum system information.

In some examples of the method, apparatuses, and non-transitory computer-readable medium described herein, the location information indicates a location for receiving the aperiodic remaining minimum system information with respect to a timing for receipt of the aperiodic synchronization signal block.

Some examples of the method, apparatuses, and non-transitory computer-readable medium described herein may further include operations, features, means, or instructions for determining that the aperiodic synchronization signal block includes an indication of a first occasion for reception of the aperiodic remaining minimum system information and a second occasion for reception of a retransmission of the aperiodic remaining minimum system information, where the first occasion and the second occasion may be indicated with respect to a timing for receipt of the aperiodic synchronization signal block, transmitting the aperiodic remaining minimum system information based on the indication of the first occasion included in the aperiodic synchronization signal block, and transmitting a retransmission of the aperiodic remaining minimum system information based on the indication of the second occasion included in the aperiodic synchronization signal block.

Some examples of the method, apparatuses, and non-transitory computer-readable medium described herein may further include operations, features, means, or instructions for transmitting, to the UE, a set of multiple aperiodic remaining minimum system information transmissions indicated by the aperiodic synchronization signal block, where the aperiodic synchronization signal block includes an indication of timing for receipt of a set of multiple aperiodic remaining minimum system information transmissions.

Some examples of the method, apparatuses, and non-transitory computer-readable medium described herein may further include operations, features, means, or instructions for transmitting, to the UE, a type indication indicating the aperiodic synchronization signal block, where transmitting the aperiodic synchronization signal block may be based on the type indication.

In some examples of the method, apparatuses, and non-transitory computer-readable medium described herein, the type indication may be transmitted in a physical broadcast channel transmission or a demodulation reference signal associated with the physical broadcast channel transmission. In some examples of the method, apparatuses, and non-transitory computer-readable medium described herein, the one or more parameters include an availability of resources or a traffic condition or both.

In some examples of the method, apparatuses, and non-transitory computer-readable medium described herein, the aperiodic synchronization signal block includes a cell defining synchronization signal block. In some examples of the method, apparatuses, and non-transitory computer-readable medium described herein, the aperiodic synchronization signal block and a periodic synchronization signal block may be associated with at least one of different synchronization rasters, different primary synchronization signal sets, different secondary synchronization signal sets, or a combination thereof.

DETAILED DESCRIPTION

Figure 1:
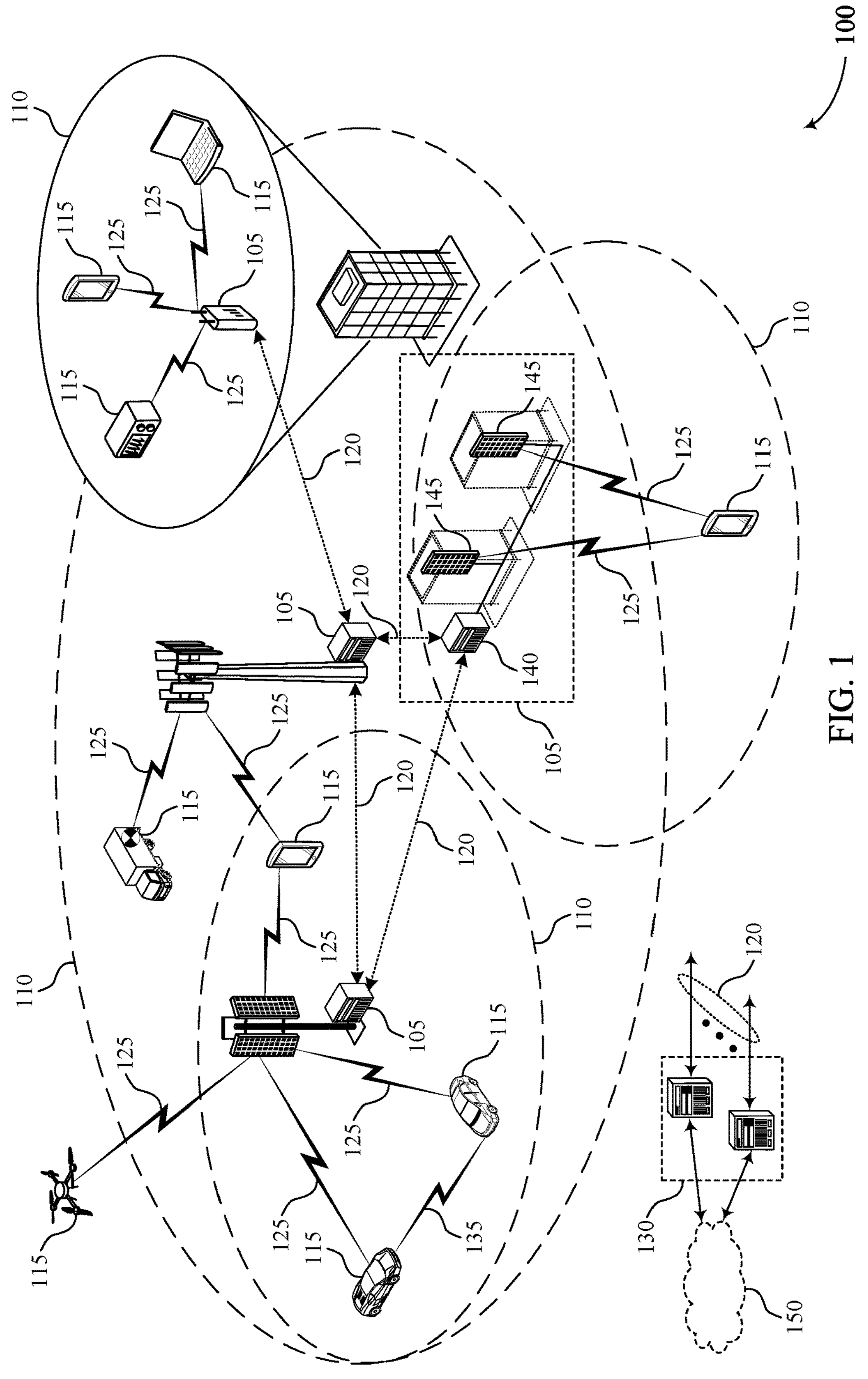
FIG. 1 illustrates an example of a wireless communications system that supports aperiodic signal transmission for initial access in accordance with aspects of the present disclosure.

A wireless communications system may support communication beams for communications between one or more communication devices. A communication beam may support a communication link between a transmitter and a receiver. For example, a communication beam may support uplink signaling, downlink signaling, connection procedures, etc. According to some examples, a transmitter (e.g., a base station, non-terrestrial devices, etc.) may be configured with multiple antennas, which may be used for transmissions. Similarly, a receiver (e.g., a user equipment (UE)) may be configured with multiple antennas, which may be used for transmissions. Some wireless communication systems may support initial access in beamformed communications between a UE and a base station. In wireless communications networks, a UE may establish an initial connection with a base station using beamformed communications. The base station may then communicate with the UE on an active base station communication beam, and the UE may communicate with the base station on an active UE communication beam.

In some cases, a base station may transmit information for initiating an initial access procedure using beamformed communications in one or more sweeping procedures. In some cases, a first beam sweeping procedure may provide a synchronization signal block via a set of beams. Additionally or alternatively, some wireless communication systems may support fixed point to point or fixed point to multi-point communications (e.g., high effective isotropic radiated power (EIRP) communications, FR4 communications, etc.). For example, a receiving UE may be immobile or have limited mobility. In such cases, the EIRP limitation may be high (e.g., up to 85 dBm). Therefore, narrow beams (e.g., pencil like beams) may be used to provide coverage over a large coverage area. In some cases, a wireless communications device may sweep a large quantity of narrow synchronization signal block beams during initial access to provide full coverage thus increasing overhead. Additionally or alternatively, the synchronization signal block beam sweeping may interfere with traffic due to the large quantity of beams being swept.

Techniques as discussed herein may provide for efficient synchronization signal block beam sweeping for use in initial access procedures to reduce overhead and minimize traffic interference. In some cases, a one-time synchronization signal block beam sweep may be performed such that the UE and the base station may establish an initial access. For example, a base station may sweep synchronization signal block beams periodically at a slower rate such that overhead is decreased and interference with other transmissions is minimized. In some cases, a base station may perform an aperiodic one-time synchronization signal block beam sweep to further reduce overhead. That is, a base station may identify periods of time where there is little to no traffic, and may transmit a synchronization signal block for initial access during at least one time of the identifier time periods. In addition, the synchronization signal block may provide information on when remaining system information will be transmitted (via an aperiodic remaining system information transmission indication). In some examples, the base station may use the remaining system information to further indicate timing for a physical random access channel procedure.

Communications devices having the capability to use aperiodic signal transmission for initial access in wireless communications may utilize the techniques described herein to experience power saving, such as extended battery life while ensuring reliable and efficient communications between UEs and base stations. Particular aspects of the subject matter described in this disclosure may be implemented to realize one or more enhancements. The techniques employed by the described UEs may provide benefits and enhancements to the operation of the UEs. For example, operations performed by the UEs may provide improvements to wireless operations. Additionally or alternatively, the techniques employed by the described UEs may provide time and power savings. In some examples, the UEs may support high reliability and low latency communications, among other examples, in accordance with one or more aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of a process flow. Aspects of the disclosure are further illustrated by and described with reference to apparatus diagrams, system diagrams, and flowcharts that relate to aperiodic signal transmission for initial access.

FIG. 1 illustrates an example of a wireless communications system 100 that supports aperiodic signal transmission for initial access in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term “cell” may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

Some wireless communication systems may support fixed use cases, such as fixed point to point or fixed point to multi-point communications (e.g., FR4 communications). For example, a UE 115 may be immobile or have limited mobility. Further, the UE 115 may support a limited number of clients which may be located far away. Therefore, supporting a large coverage area may be of increased importance for the UE 115.

In some cases, one or more of the base stations 105 may use beamforming for communications with one or more UEs 115. In some cases, base stations 105 may transmit synchronization signal blocks via multiple transmission beams in a beam sweeping procedure. In some cases, one or more base stations 105 and one or more UEs 115 may support high EIRP communications (e.g., up to 85 dBm). For example, the base stations 105 and UEs 115 may be subject to antenna gain limitations (e.g., 85 dBm may be possible if antenna gain exceeds 55 dB). Additionally, the EIRP limitation may be higher than the FR2x band (52.6 to 71 GHz). Therefore, narrow beams may be used to provide coverage. To support a large coverage area, the base station 105 may transmit a large quantity of synchronization signal block beams during synchronization signal block beam sweeping to provide full coverage which may result in increased overhead.

In some cases, a base station 105 may perform two stage synchronization signal block beam sweeping to reduce overhead. For example, the base station 105 may perform long periodicity synchronization signal block beam sweeping of a full set of synchronization signal block beams to support initial access (e.g., Stage 1). Additionally or alternatively, in some cases (e.g., for radio link monitoring (RLM)), the base station 105 may perform synchronization signal block beam sweeping on a subset of the full set of synchronization signal block beams (e.g., Stage 2). However, in some cases, synchronization signal block beam sweeping may interfere with additional traffic due to the increase in overhead. According to aspects depicted herein, a base station 105 may perform aperiodic synchronization signal block beam sweeping to support initial access and further reduce overhead.

In some examples, a UE 115 may monitor for one or more synchronization signal blocks from a base station 105. The UE 115 may receive an aperiodic synchronization signal block based on the monitoring. In some cases, the aperiodic synchronization signal block may include an indication of a timing for receipt of an aperiodic remaining minimum system information transmission. The UE 115 may then monitor for the aperiodic remaining minimum system information transmission based on receiving the aperiodic synchronization signal block.

Figure 2:
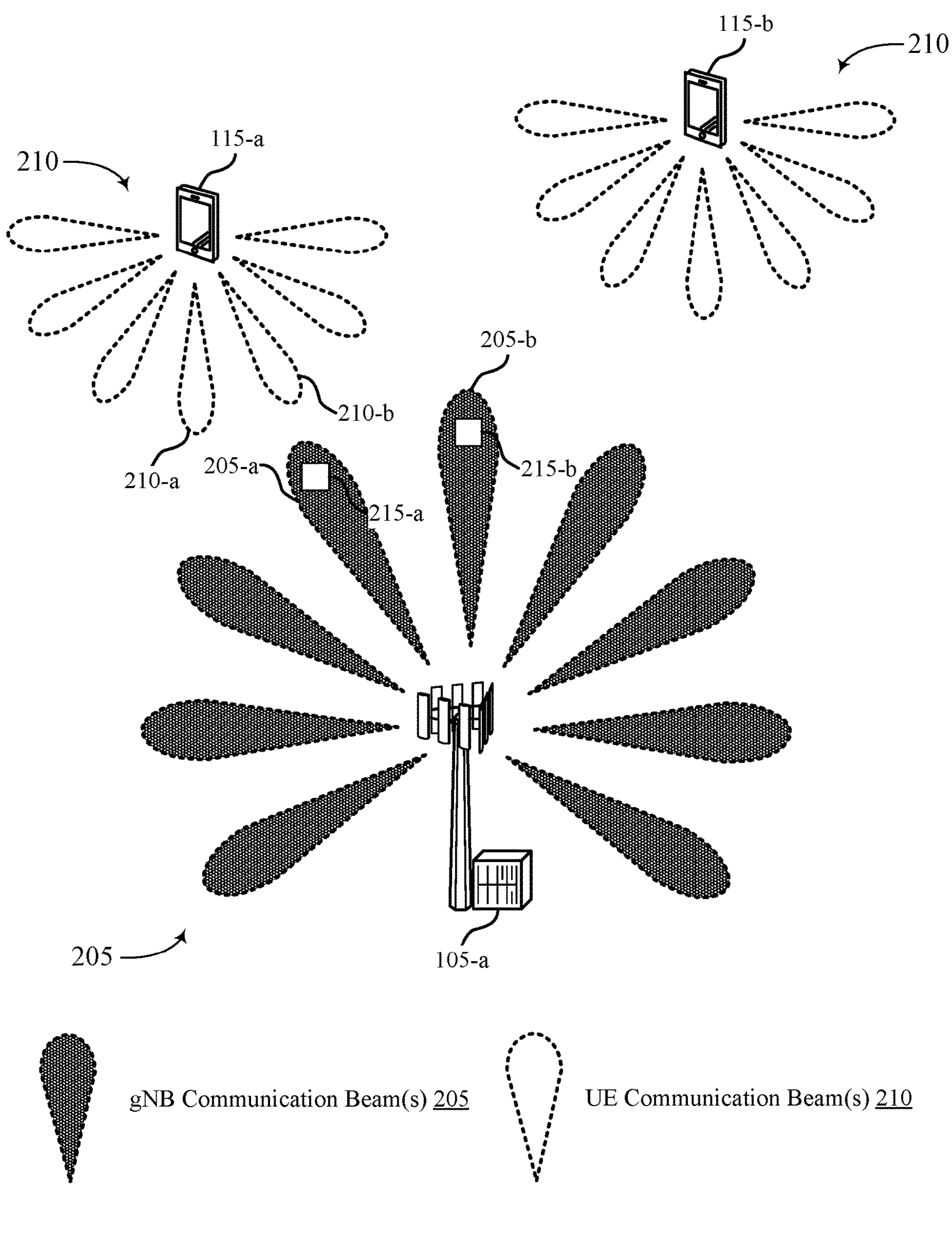
FIG. 2 illustrates an example of a wireless communications system that supports aperiodic signal transmission for initial access in accordance with aspects of the present disclosure.

FIG. 2 illustrates an example of a wireless communications system 200 that supports aperiodic signal transmission for initial access in accordance with aspects of the present disclosure. In some examples, the wireless communications system 200 may implement aspects of wireless communications system 100. The wireless communications system 200 may include a base station 105-*a* and one or more UEs 115, such as a UE 115-*a* and a UE 115-*b* (may also be referred to as devices), as described with reference to FIG. 1.

In some instances, the wireless communications system 200 may support beamformed communications, where a base station 105-*a* and the UEs 115 may communicate using directional, beamformed transmissions. As depicted herein, the wireless communications system 200 may support initial access using aperiodic signals in wireless communications networks. The wireless communications system 200 may support a beam management procedure to enhance communications efficiency in a wireless communications system. The wireless communications system 200 may enable the use of timing information for efficient communication between a transmitter and a receiver (e.g., base station 105-*a* and UEs 115-*a* and 115-*b*).

According to one or more aspects, the base station 105-*a*, the UE 115-*a* and/or the UE 115-*b* may perform a beam management procedure in order to find at least one beam pair for communication. In some examples, the base station 105-*a* may perform a beam management procedure with the UEs 115. Additionally or alternatively, the base station 105-*a* may be configured with multiple antennas, which may be used for directional or beamformed transmissions (e.g., beamformed communication beams 205). Similarly, the UEs 115-*a* and 115-*b* may be configured with multiple antennas, which may be used for directional or beamformed transmissions (e.g., beamformed communication beams 210). In some examples, the beam management procedure may include a beam sweep procedure. As depicted in the example of FIG. 2, the base station 105-*a*, the UE 115-*a* and/or the UE 115-*b* may transmit a number of beamformed communication beams in different directions within a coverage area.

In some examples, the base station 105-*a* may communicate with the UEs 115-*a* on an active communication beam 205, and the UE 115-*a* may communicate with the base station 105-*a* on an active communication beam 210, such as communication beam 210-*a* or communication beam 210-*b*. The active communication beam may be used for transmitting a transmission, such as data and control information. The active communication beam may be a downlink receive beam and an uplink transmit beam for the UEs 115, or a downlink transmit beam and an uplink receive beam for the base station 105-*a*. In some aspects, an active communication beam may change, for example, due to mobility, interference, blockage, and the like.

According to one or more aspects depicted herein, the base station 105-*a* and UEs 115, such as a UE 115-*a* and a UE 115-*b*, may communicate using beamformed or directional transmissions that carry uplink and downlink communications between the UEs 115 and the base station 105-*a*. When performing initial access, the UE 115-*a* and the UE 115-*b* may monitor (e.g., via UE communication beams(s) 210) for system information from the base station 105-*a*. For example, the base station 105-*a* may transmit the system information via multiple gNB communication beams 205 according to a beam sweeping procedure.

In some cases, the base station 105-*a* may perform multiple beam sweeps to provide system information that may be used by the UEs 115 to perform an initial access procedure. In some cases, the base station 105-*a* may transmit synchronization signal blocks 215, such as a synchronization signal block 215-*a* and a synchronization signal block 215-*b*, using gNB communication beams 205, such as a gNB communication beams 205-*a* and a gNB communication beams 205-*b* respectively, in a first beam sweeping procedure. The synchronization signal blocks 215 may be aperiodic synchronization signal blocks. In some examples, the aperiodic synchronization signal block may include an indication of a timing for receipt of an aperiodic remaining minimum system information transmission. The base station 105-*a* may transmit the aperiodic remaining minimum system information (e.g., via physical downlink control channel or physical downlink shared channel) using the gNB communication beams 205 in a second beam sweeping procedure. Additionally or alternatively, the base station 105-*a* may transmit physical random access channel using the gNB communication beams 205 in a third beam sweeping procedure to allocate random access channel occasions associated with different beams.

In some cases (e.g., high EIRP communications), the base station 105-*a* may transmit narrow gNB communication beams 205 including the synchronization signal blocks 215. Therefore, the base station 105-*a* may transmit a large quantity of the gNB communication beams 205 including the synchronization signal blocks 215 to provide full coverage, thus increasing overhead. Further, the gNB communication beams 205 including the synchronization signal blocks 215 may interfere with additional transmissions due to the increased overhead.

In some cases, the base station 105-*a* may periodically sweep the gNB communication beams 205 including the synchronization signal blocks 215 to provide full coverage or all areas in the cell. Further, the base station 105-*a* may sweep the gNB communication beams 205 including the synchronization signal blocks 215 at a slower rate to balance the overhead of synchronization signal block beam sweeping with additional transmissions. However, the overhead for the slowed down synchronization signal block beam sweeping process is non-trivial.

Techniques described herein may support aperiodic synchronization signal block beam sweeping (e.g., synchronization signal block or remaining system information or physical random access channel sweeping) to support initial access while reducing overhead. For example, a base station 105-*a* may transmit gNB communication beams 205 including aperiodic synchronization signal blocks 215 (or a one-shot synchronization signal block) when convenient, such as when the base station 105-*a* has no additional traffic to serve (e.g., the base station 105-*a* may not commit when the synchronization signal block, remaining system information, or physical random access channel for a certain beam may be carried). A UE 115 may monitor for one or more synchronization signal blocks from a base station 105-*a* and may receive an aperiodic synchronization signal block 215 based on the monitoring. The aperiodic synchronization signal block 215 may include an indication of a timing for receipt of an aperiodic remaining minimum system information transmission. The UE 115 may then monitor for the aperiodic remaining minimum system information transmission based on receiving the aperiodic synchronization signal block 215.

In some examples, the base station 105-*a* may sweep a first subset of a full set of synchronization signal blocks 215 at a first time, and a second subset of the full set of synchronization signal blocks 215 at a second time (e.g., the transmission or reception may be distributed to fit traffic need). For example, the base station 105-*a* may sweep the gNB communication beams 205-*a* containing the synchronization signal block 215-*a* at a first time and sweep the gNB communication beams 205-*b* containing the synchronization signal block 215-*b* at a second time. It is to be understood that, though the examples contained herein discuss transmission of two sets, additional sets may exist.

The base station 105-*a* may transmit the synchronization signal block 215 on a synchronization raster. In some cases, the base station 105-*a* may transmit a synchronization signal block 215-*a* using a set of quasi co-location (QCL) properties and may transmit a synchronization signal block 215-*b* using the same set of QCL properties (e.g., synchronization signal block 215-*a* and synchronization signal block 215-*b* may be quasi co-located). Alternatively, the base station 105-*a* may transmit the synchronization signal block 215-*a* using a set of QCL properties and may transmit the synchronization signal block 215-*b* using a different set of QCL properties (e.g., there may not be a commitment for the base station 105-*a* to send the same QCL synchronization signal block at a fixed location). The base station 105-*a* may introduce a maximum gap between a synchronization signal block transmission with the same QCL to limit the UE searching time (instead of the period). As a result, there may not be a fixed QCL relationship between synchronization signal block transmitted at different times. Additionally or alternatively, the synchronization signal blocks 215 (e.g., physical broadcast channel) may provide information for an initial downlink bandwidth part.

In some cases, the synchronization signal blocks 215 including physical broadcast channel and demodulation reference signals, may provide system timing. For example, a UE 115-*a* may detect the synchronization signal block 215-*a* and determine system frame number (SFN) timing. As an illustrative example, the base station 105-*a* may define 64 synchronization signal blocks 215 locations for every 5 milliseconds (ms). In some other cases, the base station 105-*a* may define more than 64 synchronization signal blocks 215 locations every 5 ms and may increase the number of synchronization signal block 215 indices to provide timing information. Alternatively, the base station 105-*a* may provide timing in remaining system information, which may imply that the remaining system information payload may be time varying. For example, if timing is not provided by the synchronization signal blocks 215, a demodulation reference signal scrambling for remaining system information may not depend on timing. As an illustrative example, the demodulation reference signal scrambling for remaining system information may be a function of a cell identifier or may depend on synchronization signal block 215 information, such as synchronization signal block 215 index. In some examples, the UE 115-*a* may determine that the aperiodic synchronization signal block 215 lacks timing information for reception of a aperiodic remaining minimum system information. In such cases, the UE 115-*a* may refrain from performing a demodulation reference signal scrambling for the aperiodic remaining minimum system information using the timing information based on the determining.

In some examples, the synchronization signal blocks 215 may provide information for when remaining system information physical downlink control channel or physical downlink shared channel may be transmitted (e.g., the synchronization signal blocks 215 may provide a one shot indication rather than a periodic set of locations for remaining system information physical downlink control channel or physical downlink shared channel), further described with reference to FIG. 3. Additionally or alternatively, the synchronization signal blocks 215 may point to a remaining system information reception location (e.g., the location for Type0 physical downlink control channel search space may not be provided as a periodic pattern with a few bits in physical broadcast channel). For example, a few bits in the physical broadcast channel (e.g., defining the coreset #0 shape) may point to a one-shot remaining system information physical downlink control channel monitoring (e.g., with respect to synchronization signal block transmission time). In some cases, the UEs 115 may support multiple monitoring occasions for better flexibility at higher UE detection complexity but may be with respect to the same synchronization signal block 215. In some cases, the UEs 115 may support more than one remaining system information monitoring occasion to allow remaining system information retransmission.

In some examples, the base station 105-*a* may determine when to transmit the synchronization signal blocks 215 based on an availability of resources. For example, the base station 105-*a* may consider a transmission time for a subsequent remaining system information and physical random access channel transmission when determining the transmission time for synchronization signal blocks 215. Additionally or alternatively, the base station 105-*a* may transmit groups of synchronization signal blocks 215 (e.g., bursts). In some cases, the base station 105-*a* may refrain from transmitting synchronization signal blocks 215 according to a fixed burst structure (e.g., the base station 105-*a* may transmit synchronization signal blocks 215 using different structures and synchronization signal blocks 215 composition for different bursts).

In some cases, techniques described herein may support radio resource management (RRM) for a UE 115-*a* to discover additional cells. In some cases, such as in a fixed deployment scenario, handover may not be a frequent event or time critical event (e.g., slow, full beam sweeping is acceptable). As an illustrative example, if there is coordination between one or more base stations 105, if a first base station 105 determines to send synchronization signal block, then the base station 105 may indicate the determination to a second base station 105. The second base station 105 may signal to a UE 115 to perform aperiodic synchronization signal block RRM as well. Additionally or alternatively, techniques described herein for synchronization signal block beam sweeping may be used for slow beam discovery.

Figure 3:
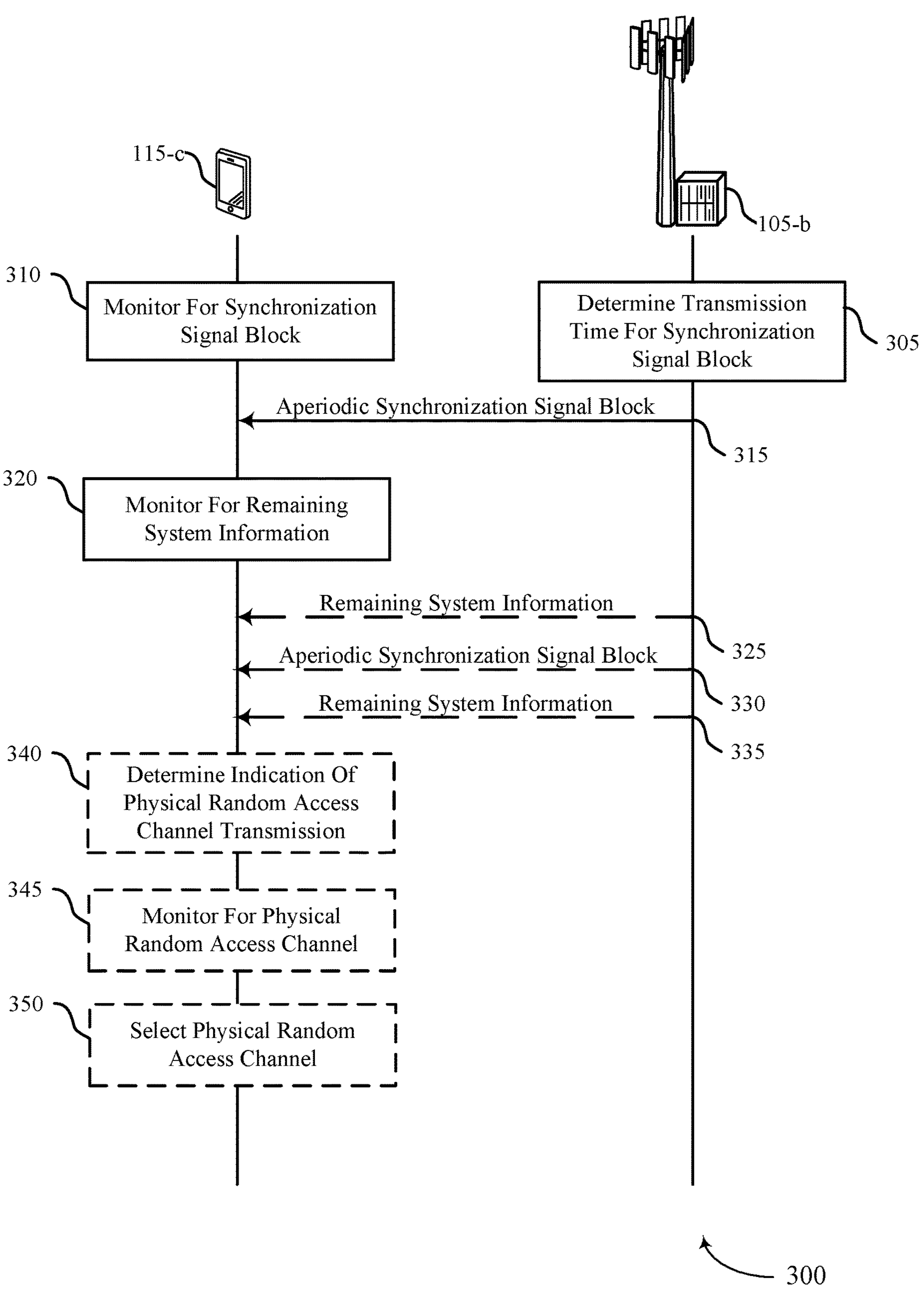
FIG. 3 illustrates an example of a process flow that supports aperiodic signal transmission for initial access in accordance with aspects of the present disclosure.

FIG. 3 illustrates an example of a process flow 300 that supports aperiodic signal transmission for initial access in accordance with aspects of the present disclosure. In some examples, the process flow 300 may implement aspects of wireless communications system 100 and wireless communications system 200 described with reference to FIGS. 1 and 2, respectively. For example, the process flow 300 may be based on one or more rules for aperiodic transmission of signals for initial access in wireless communications systems. The process flow 300 may be implemented by the UE 115-*c* and the base station 105-*b* for reduced power consumption, and may promote low latency and low interference for wireless communications supporting high priority channels, among other benefits. The base station 105-*b* and the UE 115-*c* (may also be referred to as devices) may be examples of a base station 105 and a UE 115, as described with reference to FIGS. 1 and 2.

In the following description of the process flow 300, the operations between the base station 105-*b* and the UE 115-*c* may be transmitted in a different order than the example order shown, or the operations performed by the base station 105-*b* and the UE 115-*c* may be performed in different orders or at different times. Some operations may also be omitted from the process flow 300, and other operations may be added to the process flow 300.

At 305, a base station 105-*b* may determine a transmission time for an aperiodic synchronization signal block based on one or more parameters. In some examples, the one or more parameters may include an availability of resources or a traffic condition or both. At 310, a UE 115-*c* may monitor for one or more synchronization signal blocks from the base station 105-*b*.

At 315, the UE 115-*c* may receive an aperiodic synchronization signal block based on the monitoring. The aperiodic synchronization signal block may include an indication of a remaining system information transmission (e.g., one time trigger). In some cases, the UE 115-*c* may determine the aperiodic synchronization signal block includes timing information associated with reception of the remaining system information. In some other cases, the UE 115-*c* may determine that the aperiodic synchronization signal block lacks timing information associated with reception of the remaining system information. In such cases, the UE 115-*c* may refrain from performing a demodulation reference signal scrambling for the remaining system information using the timing information.

In some cases, the UE 115-*c* may determine that the aperiodic synchronization signal block includes location information associated with reception of the remaining system information. The location information may indicate a location for receiving the remaining system information with respect to a time of reception of the aperiodic synchronization signal block. In some cases, the UE 115-*c* may receive the aperiodic synchronization signal block including an indication of a set of remaining system information (e.g., can support soft combining for the remaining system information triggered by a common synchronization signal block transmission). Additionally or alternatively, the UE 115-*c* may determine the aperiodic synchronization signal block includes an indication of a first occasion for reception of remaining system information and a second occasion for reception remaining system information.

In some cases, the UE 115-*c* may receive, from the base station 105-*b*, a type indication indicating the aperiodic synchronization signal block. In some examples, the UE 115-*c* may monitor for the one or more synchronization signal blocks based on the type indication. In some cases, the type indication is transmitted in a physical broadcast channel transmission or a demodulation reference signal associated with the physical broadcast channel transmission.

In some cases, the UE 115-*c* may use the aperiodic synchronization signal block to perform an initial access operation. In some cases, the aperiodic synchronization signal block may include a cell defining synchronization signal block. Additionally or alternatively, the aperiodic synchronization signal block and a periodic synchronization signal block may be associated with at least one of different synchronization rasters, different primary synchronization signal sets, different secondary synchronization signal sets, or a combination thereof.

At 320, the UE 115-*c* may monitor for the remaining system information. For example, the UE 115-*c* may use the indicated location (indicated via the aperiodic synchronization signal block) to monitor for the remaining system information. In some cases, if the UE 115-*c* fails to detect the remaining system information physical downlink control channel or physical downlink shared channel at the indicated location (or decoding failure), then the UE 115-*c* may try to detect the synchronization signal block again to identify the next remaining system information transmission. In some cases, the UE 115-*c* may not start from scratch to detect primary synchronization signal (e.g., the OFDM symbol level timing or slot level timing may be known; therefore the physical cell identifier may be known). In such cases, the UE 115-*c* may skip to frequency domain secondary synchronization signal detection for the synchronization signal block instead of starting from the time domain primary synchronization signal detection.

At 325, the UE 115-*c* may receive, from the base station 105-*b*, the remaining system information based on the timing information. The UE 115-*c* may not receive the remaining system information over a period of time (e.g., the remaining system information content may not be maintained over the long period of time). In some cases, the UE 115-*c* may receive the remaining system information based on receiving the synchronization signal block. In some cases, the UE 115-*c* may receive the remaining system information based on the location information indicated in the aperiodic synchronization signal block. In some cases, the UE 115-*c* may receive the remaining system information based on the indication of a first occasion. In some cases, the UE 115-*c* may receive the remaining system information based on the indication of a second occasion.

In some cases, the UE 115-*c* may determine that a physical downlink control channel or a physical downlink shared channel associated with the remaining system information is not received at the UE 115-*c*. Additionally or alternatively, the UE 115-*c* may monitor for a second aperiodic synchronization signal block based on determining that the physical downlink control channel or physical downlink shared channel associated with the remaining system information is not received at the UE 115-*c*.

At 330, the UE 115-*c* may optionally receive a second aperiodic synchronization signal block including an indication of a second remaining system information. At 335, the UE 115-*c* may optionally receive the second remaining system information based on the indication in the second synchronization signal block.

At 340, the UE 115-*c* may optionally determine that the remaining system information includes an indication of one or more occasions for physical random access channel transmissions (e.g., one-time trigger rather than providing periodic resources for physical random access channel). In some cases, the base station 105-*b* may use multiple occasions for power ramping. Alternatively, physical random access channel power ramping may go across physical random access channel opportunities from different synchronization signal blocks. In some occasions, one remaining system information for a beam may trigger one beam for physical random access channel (e.g., rather than a synchronization signal block to physical random access channel mapping pattern).

At 345, the UE 115-*c* may optionally monitor for the one or more occasions for the physical random access channel transmission. At 350, the UE 115-*c* may optionally select at least one occasion of the physical random access channel based on the monitoring. After the physical random access channel selection, the UE 115-*c* may perform follow up transmissions of a msg2, a msg3, and a msg4 of a physical random access channel procedure.

Figure 4:
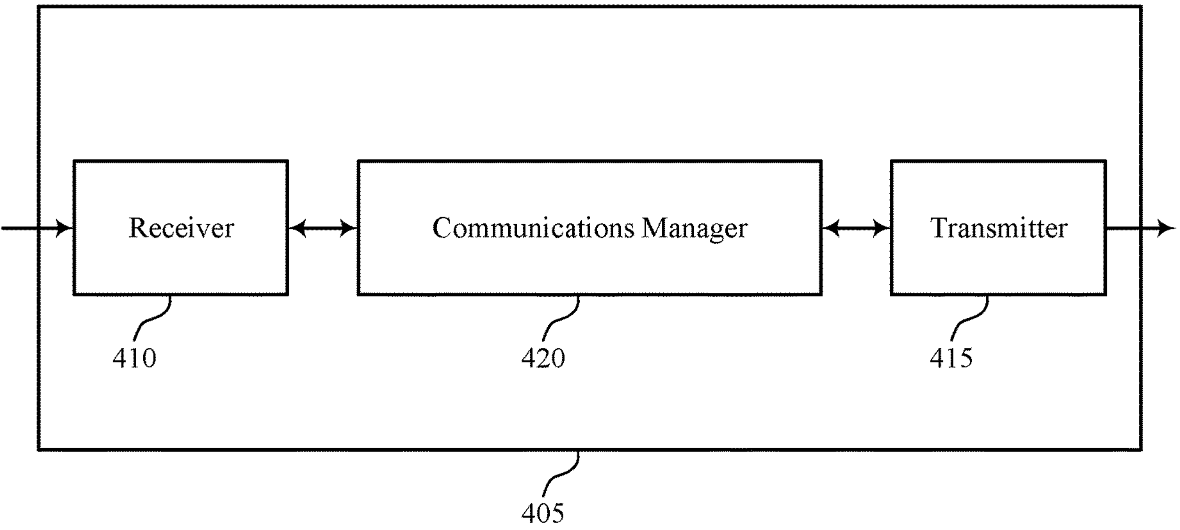
FIGS. 4 and 5 show block diagrams of devices that support aperiodic signal transmission for initial access in accordance with aspects of the present disclosure.

FIG. 4 shows a block diagram 400 of a device 405 that supports aperiodic signal transmission for initial access in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to aperiodic signal transmission for initial access). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to aperiodic signal transmission for initial access). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of aperiodic signal transmission for initial access as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for monitoring for one or more synchronization signal blocks from a base station. The communications manager 420 may be configured as or otherwise support a means for receiving an aperiodic synchronization signal block based on the monitoring, the aperiodic synchronization signal block including an indication of a timing for receipt of an aperiodic remaining minimum system information transmission. The communications manager 420 may be configured as or otherwise support a means for monitoring for the aperiodic remaining minimum system information transmission based on receiving the aperiodic synchronization signal block.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reduced processing, reduced power consumption, and more efficient utilization of communication resources.

Figure 5:
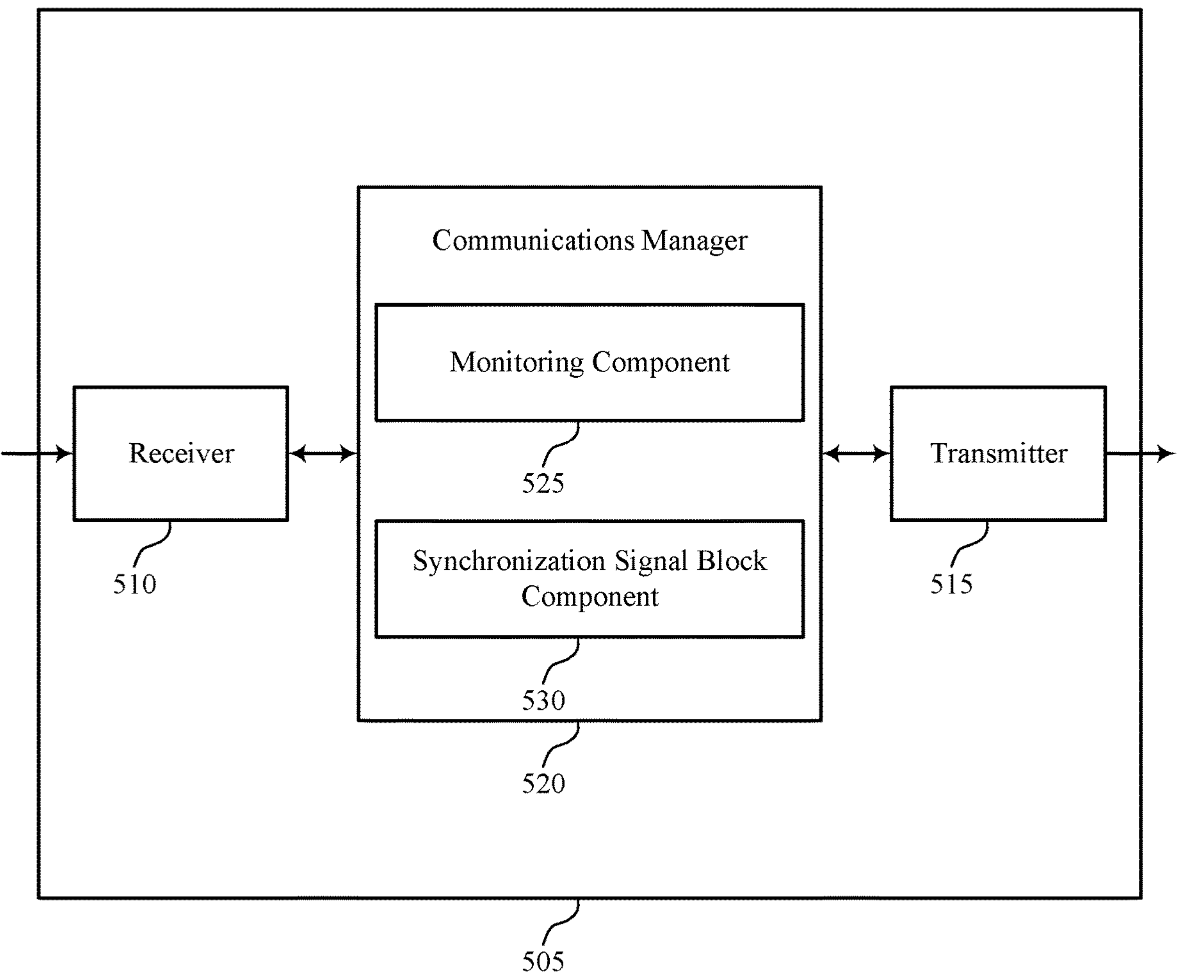

FIG. 5 shows a block diagram 500 of a device 505 that supports aperiodic signal transmission for initial access in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to aperiodic signal transmission for initial access). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to aperiodic signal transmission for initial access). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of aperiodic signal transmission for initial access as described herein. For example, the communications manager 520 may include a monitoring component 525 a synchronization signal block component 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The monitoring component 525 may be configured as or otherwise support a means for monitoring for one or more synchronization signal blocks from a base station. The synchronization signal block component 530 may be configured as or otherwise support a means for receiving an aperiodic synchronization signal block based on the monitoring, the aperiodic synchronization signal block including an indication of a timing for receipt of an aperiodic remaining minimum system information transmission. The monitoring component 525 may be configured as or otherwise support a means for monitoring for the aperiodic remaining minimum system information transmission based on receiving the aperiodic synchronization signal block.

Figure 6:
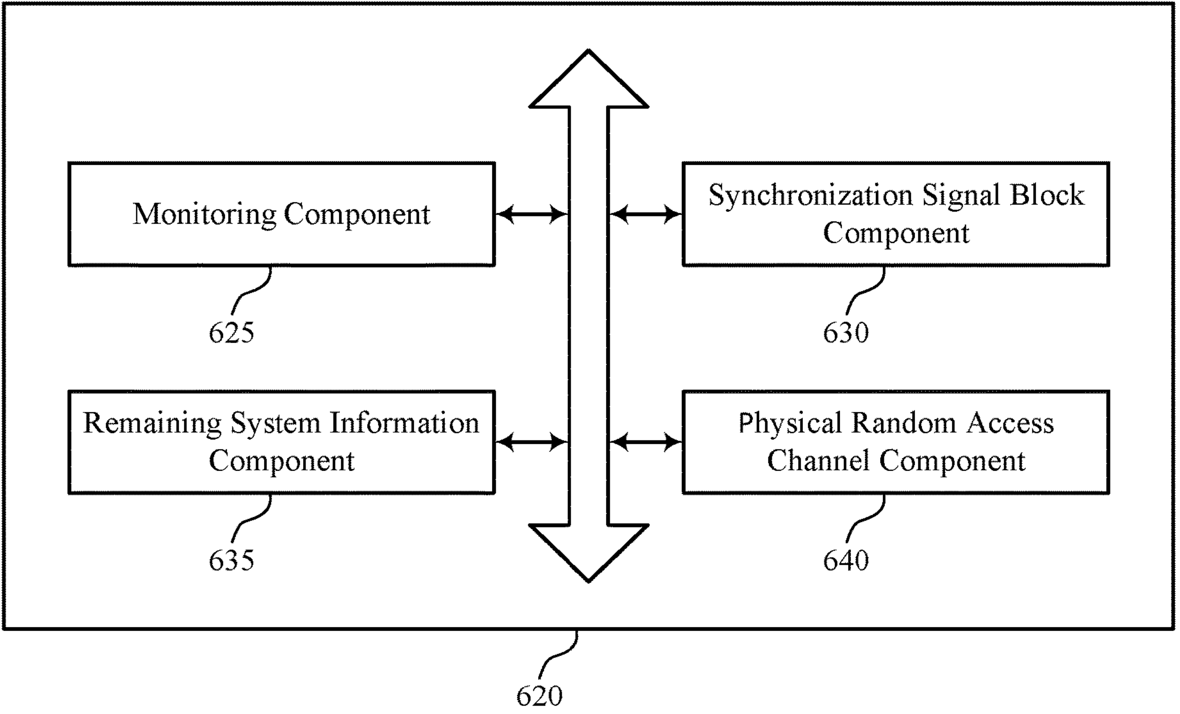
FIG. 6 shows a block diagram of a communications manager that supports aperiodic signal transmission for initial access in accordance with aspects of the present disclosure.

FIG. 6 shows a block diagram 600 of a communications manager 620 that supports aperiodic signal transmission for initial access in accordance with aspects of the present disclosure. The communications manager 620 may be an example of aspects of a communications manager 420, a communications manager 520, or both, as described herein. The communications manager 620, or various components thereof, may be an example of means for performing various aspects of aperiodic signal transmission for initial access as described herein. For example, the communications manager 620 may include a monitoring component 625, a synchronization signal block component 630, a remaining system information component 635, a physical random access channel component 640, or any combination thereof. Each of these components may communicate, directly or indirectly, with one another (e.g., via one or more buses).

The communications manager 620 may support wireless communication at a UE in accordance with examples as disclosed herein. The monitoring component 625 may be configured as or otherwise support a means for monitoring for one or more synchronization signal blocks from a base station. The synchronization signal block component 630 may be configured as or otherwise support a means for receiving an aperiodic synchronization signal block based on the monitoring, the aperiodic synchronization signal block including an indication of a timing for receipt of an aperiodic remaining minimum system information transmission. In some examples, the monitoring component 625 may be configured as or otherwise support a means for monitoring for the aperiodic remaining minimum system information transmission based on receiving the aperiodic synchronization signal block.

In some examples, the remaining system information component 635 may be configured as or otherwise support a means for receiving, from the base station, the aperiodic remaining minimum system information based on the timing for receipt of the aperiodic remaining minimum system information included in the aperiodic synchronization signal block. In some examples, the remaining system information component 635 may be configured as or otherwise support a means for determining that the aperiodic remaining minimum system information includes an indication of timing for one or more occasions for physical random access channel transmission. In some examples, the physical random access channel component 640 may be configured as or otherwise support a means for selecting at least one occasion for the physical random access channel transmission based on the timing for the one or more occasions for the physical random access channel transmission.

In some examples, the synchronization signal block component 630 may be configured as or otherwise support a means for determining that the aperiodic synchronization signal block includes location information for receipt of the aperiodic remaining minimum system information. In some examples, the remaining system information component 635 may be configured as or otherwise support a means for receiving the aperiodic remaining minimum system information based on the location information for receipt of the aperiodic remaining minimum system information. In some examples, the location information indicates a location for receiving the aperiodic remaining minimum system information with respect to a timing for receipt of the aperiodic synchronization signal block.

In some examples, the synchronization signal block component 630 may be configured as or otherwise support a means for receiving a second aperiodic synchronization signal block based on the monitoring. In some examples, the synchronization signal block component 630 may be configured as or otherwise support a means for determining that the second aperiodic synchronization signal block lacks timing information for reception of a second aperiodic remaining minimum system information. In some examples, the remaining system information component 635 may be configured as or otherwise support a means for refraining from performing a demodulation reference signal scrambling for the second aperiodic remaining minimum system information using the timing information based on the determining.

In some examples, the synchronization signal block component 630 may be configured as or otherwise support a means for determining that the aperiodic synchronization signal block includes an indication of a first occasion for reception of the aperiodic remaining minimum system information and a second occasion for reception of a retransmission of the aperiodic remaining minimum system information, where the first occasion and the second occasion are indicated with respect to a timing for receipt of the aperiodic synchronization signal block. In some examples, the remaining system information component 635 may be configured as or otherwise support a means for receiving the aperiodic remaining minimum system information based on the indication of the first occasion included in the aperiodic synchronization signal block. In some examples, the remaining system information component 635 may be configured as or otherwise support a means for receiving a retransmission of the aperiodic remaining minimum system information based on the indication of the second occasion included in the aperiodic synchronization signal block.

In some examples, the remaining system information component 635 may be configured as or otherwise support a means for determining that a physical downlink control channel or a physical downlink shared channel associated with the aperiodic remaining minimum system information is not received at the UE. In some examples, the synchronization signal block component 630 may be configured as or otherwise support a means for monitoring for a second aperiodic synchronization signal block based on determining that the physical downlink control channel or the physical downlink shared channel associated with the aperiodic remaining minimum system information is not received at the UE. In some examples, the synchronization signal block component 630 may be configured as or otherwise support a means for receiving the second aperiodic synchronization signal block including an indication of a timing for receipt of a second aperiodic remaining minimum system information. In some examples, the remaining system information component 635 may be configured as or otherwise support a means for receiving the second aperiodic remaining minimum system information based on the timing for receipt of the second aperiodic remaining minimum system information included in the second aperiodic synchronization signal block.

In some examples, the remaining system information component 635 may be configured as or otherwise support a means for receiving, from the base station, a set of multiple aperiodic remaining minimum system information transmissions indicated by the aperiodic synchronization signal block, where the aperiodic synchronization signal block includes an indication of timing for receipt of a set of multiple aperiodic remaining minimum system information transmissions.

In some examples, the remaining system information component 635 may be configured as or otherwise support a means for determining that the aperiodic remaining minimum system information associated with a first beam indicates a second beam for selecting an occasion for a physical random access channel transmission. In some examples, the physical random access channel component 640 may be configured as or otherwise support a means for selecting the occasion for the physical random access channel transmission based on the determining.

In some examples, the synchronization signal block component 630 may be configured as or otherwise support a means for receiving, from a base station, a type indication indicating the aperiodic synchronization signal block, where monitoring for the one or more synchronization signal blocks is based on the type indication.

In some examples, the type indication is transmitted in a physical broadcast channel transmission or a demodulation reference signal associated with the physical broadcast channel transmission. In some examples, the UE uses the aperiodic synchronization signal block to perform an initial access operation.

In some examples, the aperiodic synchronization signal block includes a cell defining synchronization signal block. In some examples, the aperiodic synchronization signal block and a periodic synchronization signal block are associated with at least one of different synchronization rasters, different primary synchronization signal sets, different secondary synchronization signal sets, or a combination thereof.

Figure 7:
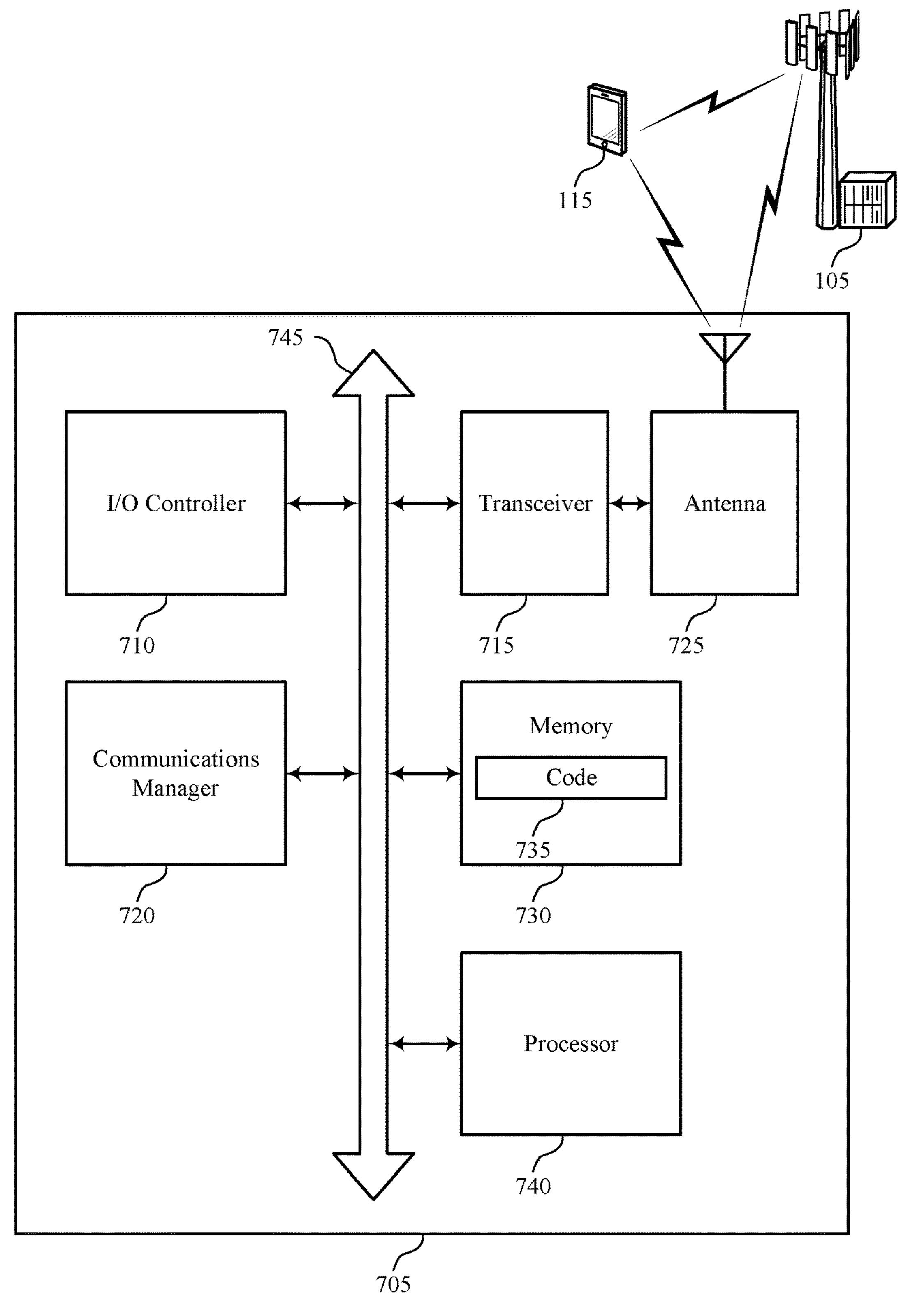
FIG. 7 shows a diagram of a system including a device that supports aperiodic signal transmission for initial access in accordance with aspects of the present disclosure.

FIG. 7 shows a diagram of a system 700 including a device 705 that supports aperiodic signal transmission for initial access in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting aperiodic signal transmission for initial access). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for monitoring for one or more synchronization signal blocks from a base station. The communications manager 720 may be configured as or otherwise support a means for receiving an aperiodic synchronization signal block based on the monitoring, the aperiodic synchronization signal block including an indication of a timing for receipt of an aperiodic remaining minimum system information transmission. The communications manager 720 may be configured as or otherwise support a means for monitoring for the aperiodic remaining minimum system information transmission based on receiving the aperiodic synchronization signal block.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of aperiodic signal transmission for initial access as described herein, or the processor 740 and the memory 730 may be otherwise configured to perform or support such operations.

Figure 8:
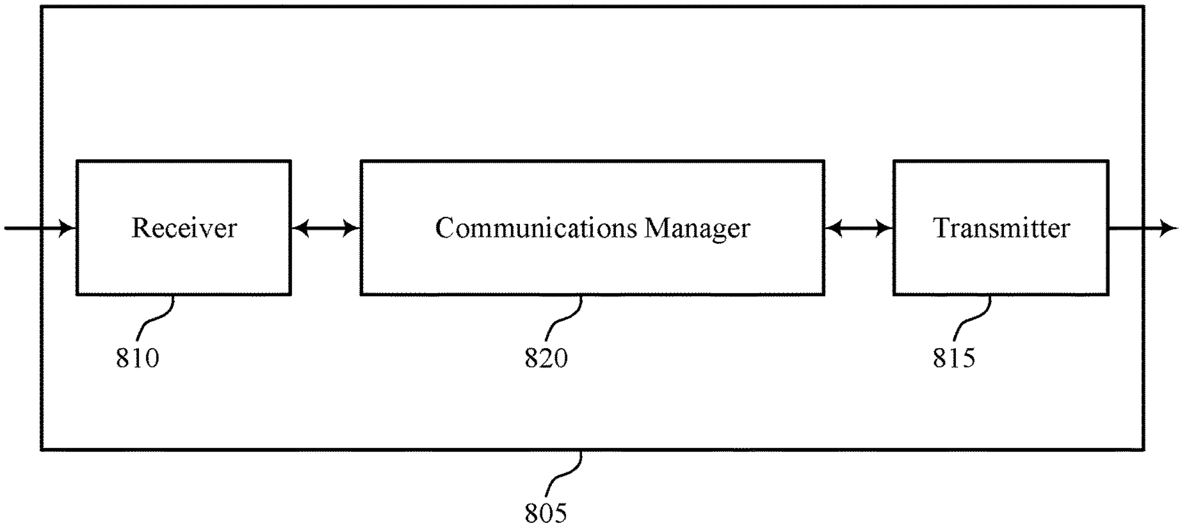
FIGS. 8 and 9 show block diagrams of devices that support aperiodic signal transmission for initial access in accordance with aspects of the present disclosure.

FIG. 8 shows a block diagram 800 of a device 805 that supports aperiodic signal transmission for initial access in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to aperiodic signal transmission for initial access). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to aperiodic signal transmission for initial access). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of aperiodic signal transmission for initial access as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for determining a transmission time for an aperiodic synchronization signal based on one or more parameters. The communications manager 820 may be configured as or otherwise support a means for transmitting, to a UE, an aperiodic synchronization signal block at the determined transmission time, the aperiodic synchronization signal block including an indication timing for receipt of an aperiodic remaining minimum system information transmission.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reduced processing, reduced power consumption, and more efficient utilization of communication resources.

Figure 9:
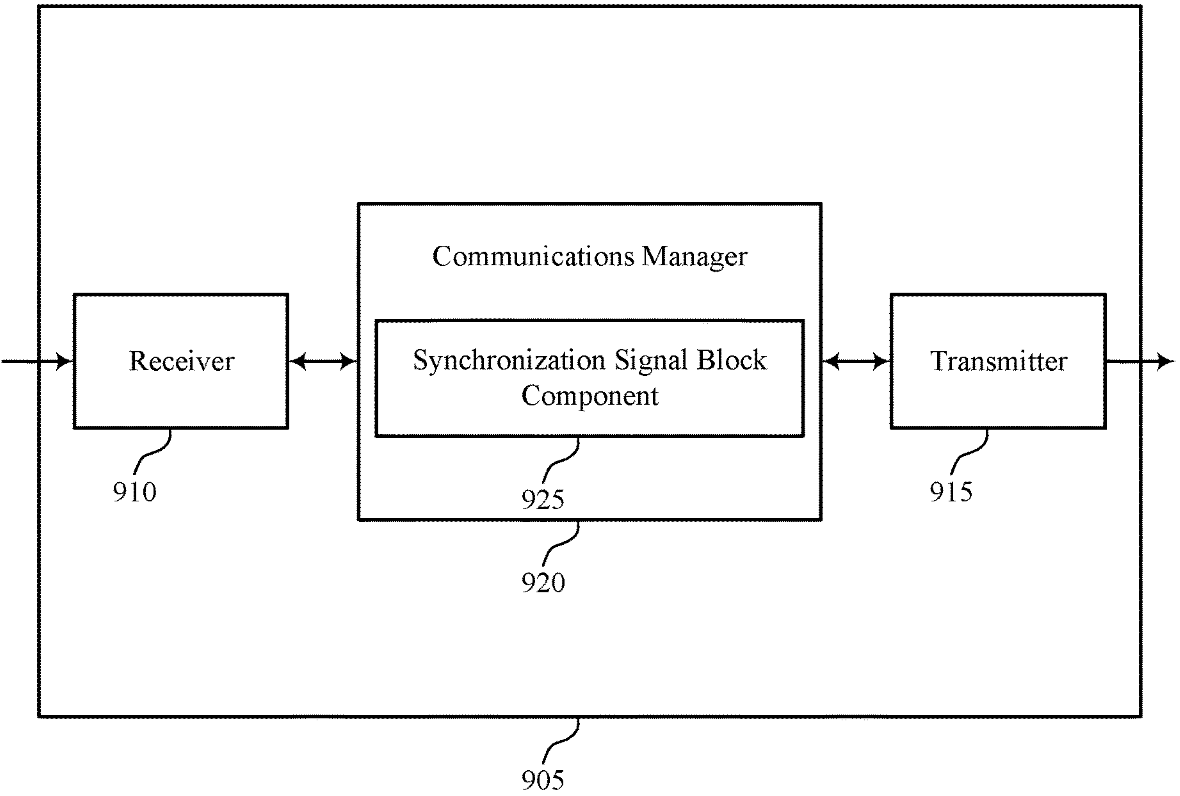

FIG. 9 shows a block diagram 900 of a device 905 that supports aperiodic signal transmission for initial access in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to aperiodic signal transmission for initial access). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to aperiodic signal transmission for initial access). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of aperiodic signal transmission for initial access as described herein. For example, the communications manager 920 may include an synchronization signal block component 925, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The synchronization signal block component 925 may be configured as or otherwise support a means for determining a transmission time for an aperiodic synchronization signal based on one or more parameters. The synchronization signal block component 925 may be configured as or otherwise support a means for transmitting, to a UE, an aperiodic synchronization signal block at the determined transmission time, the aperiodic synchronization signal block including an indication timing for receipt of an aperiodic remaining minimum system information transmission.

Figure 10:
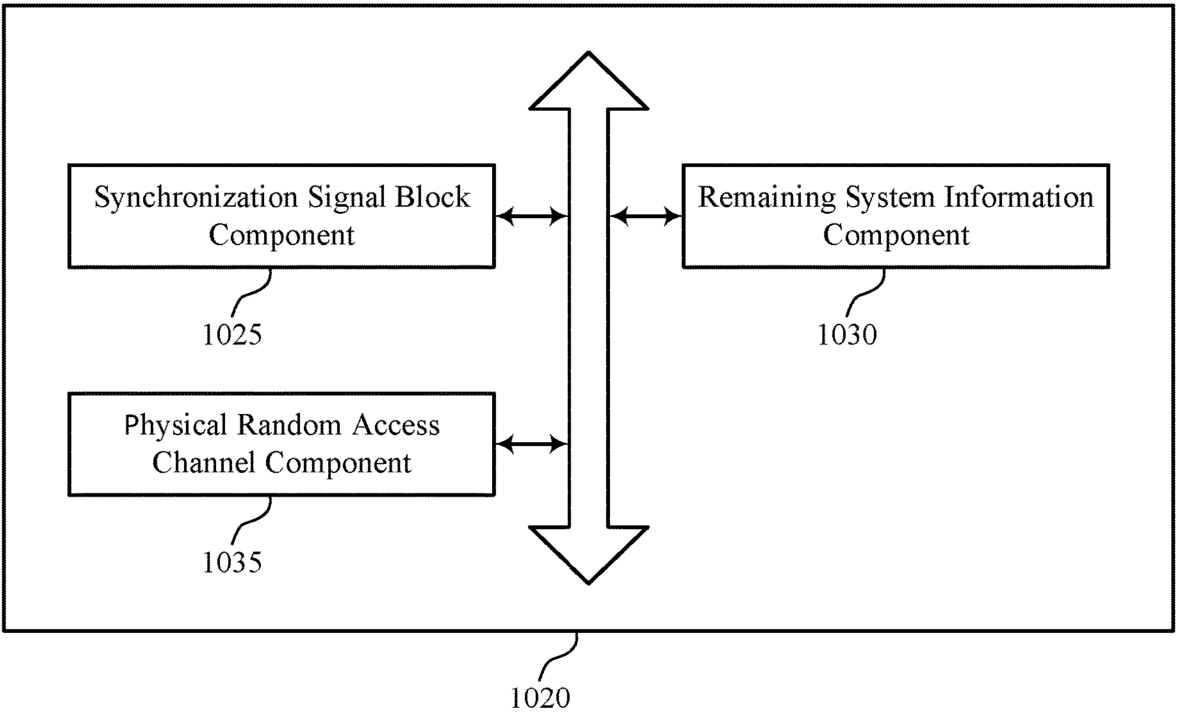
FIG. 10 shows a block diagram of a communications manager that supports aperiodic signal transmission for initial access in accordance with aspects of the present disclosure.

FIG. 10 shows a block diagram 1000 of a communications manager 1020 that supports aperiodic signal transmission for initial access in accordance with aspects of the present disclosure. The communications manager 1020 may be an example of aspects of a communications manager 820, a communications manager 920, or both, as described herein. The communications manager 1020, or various components thereof, may be an example of means for performing various aspects of aperiodic signal transmission for initial access as described herein. For example, the communications manager 1020 may include a synchronization signal block component 1025, a remaining system information component 1030, a physical random access channel component 1035, or any combination thereof. Each of these components may communicate, directly or indirectly, with one another (e.g., via one or more buses).

The communications manager 1020 may support wireless communication at a base station in accordance with examples as disclosed herein. The synchronization signal block component 1025 may be configured as or otherwise support a means for determining a transmission time for an aperiodic synchronization signal based on one or more parameters. In some examples, the synchronization signal block component 1025 may be configured as or otherwise support a means for transmitting, to a UE, an aperiodic synchronization signal block at the determined transmission time, the aperiodic synchronization signal block including an indication timing for receipt of an aperiodic remaining minimum system information transmission.

In some examples, the remaining system information component 1030 may be configured as or otherwise support a means for transmitting, to the UE, the aperiodic remaining minimum system information including an indication of a timing of one or more occasions for physical random access channel transmission. In some examples, the physical random access channel component 1035 may be configured as or otherwise support a means for receiving, from the UE, the physical random access channel transmission based on the timing for the one or more occasions for the physical random access channel transmission.

In some examples, the synchronization signal block component 1025 may be configured as or otherwise support a means for determining that the aperiodic synchronization signal block includes location information for receipt of the aperiodic remaining minimum system information. In some examples, the remaining system information component 1030 may be configured as or otherwise support a means for transmitting the aperiodic remaining minimum system information based on the location information for receipt of the aperiodic remaining minimum system information. In some examples, the location information indicates a location for receiving the aperiodic remaining minimum system information with respect to a timing for receipt of the aperiodic synchronization signal block.

In some examples, the synchronization signal block component 1025 may be configured as or otherwise support a means for determining that the aperiodic synchronization signal block includes an indication of a first occasion for reception of the aperiodic remaining minimum system information and a second occasion for reception of a retransmission of the aperiodic remaining minimum system information, where the first occasion and the second occasion are indicated with respect to a timing for receipt of the aperiodic synchronization signal block. In some examples, the remaining system information component 1030 may be configured as or otherwise support a means for transmitting the aperiodic remaining minimum system information based on the indication of the first occasion included in the aperiodic synchronization signal block. In some examples, the remaining system information component 1030 may be configured as or otherwise support a means for transmitting a retransmission of the aperiodic remaining minimum system information based on the indication of the second occasion included in the aperiodic synchronization signal block.

In some examples, the remaining system information component 1030 may be configured as or otherwise support a means for transmitting, to the UE, a set of multiple aperiodic remaining minimum system information transmissions indicated by the aperiodic synchronization signal block, where the aperiodic synchronization signal block includes an indication of timing for receipt of a set of multiple aperiodic remaining minimum system information transmissions.

In some examples, the synchronization signal block component 1025 may be configured as or otherwise support a means for transmitting, to the UE, a type indication indicating the aperiodic synchronization signal block, where transmitting the aperiodic synchronization signal block is based on the type indication. In some examples, the type indication is transmitted in a physical broadcast channel transmission or a demodulation reference signal associated with the physical broadcast channel transmission.

In some examples, the one or more parameters include an availability of resources or a traffic condition or both. In some examples, the aperiodic synchronization signal block includes a cell defining synchronization signal block. In some examples, the aperiodic synchronization signal block and a periodic synchronization signal block are associated with at least one of different synchronization rasters, different primary synchronization signal sets, different secondary synchronization signal sets, or a combination thereof.

Figure 11:
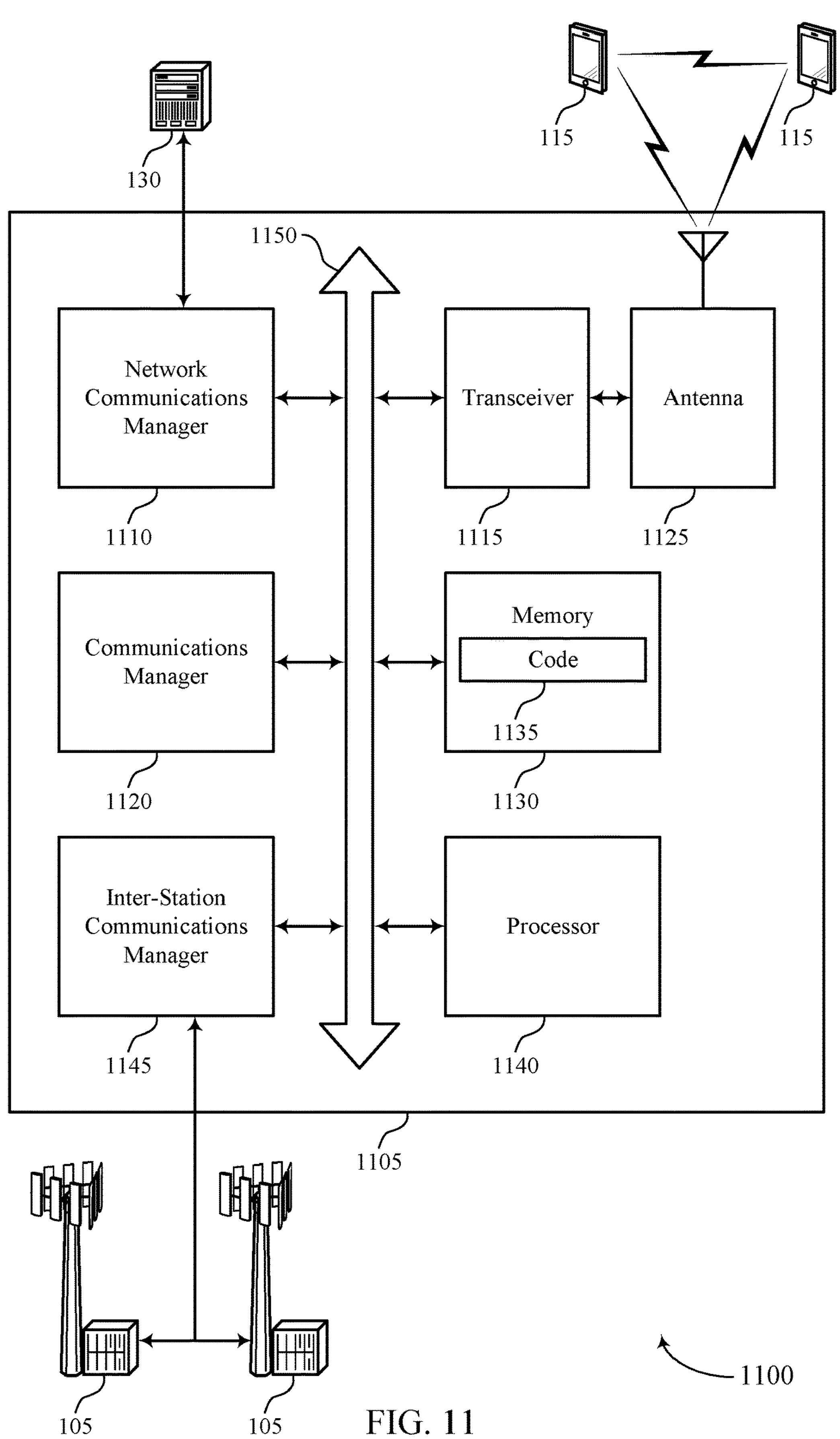
FIG. 11 shows a diagram of a system including a device that supports aperiodic signal transmission for initial access in accordance with aspects of the present disclosure.

FIG. 11 shows a diagram of a system 1100 including a device 1105 that supports aperiodic signal transmission for initial access in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting aperiodic signal transmission for initial access). For example, the device 1105 or a component of the device 1105 may include a processor 1140 and memory 1130 coupled with or to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for determining a transmission time for an aperiodic synchronization signal based on one or more parameters. The communications manager 1120 may be configured as or otherwise support a means for transmitting, to a UE, an aperiodic synchronization signal block at the determined transmission time, the aperiodic synchronization signal block including an indication timing for receipt of an aperiodic remaining minimum system information transmission.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of aperiodic signal transmission for initial access as described herein, or the processor 1140 and the memory 1130 may be otherwise configured to perform or support such operations.

Figure 12:
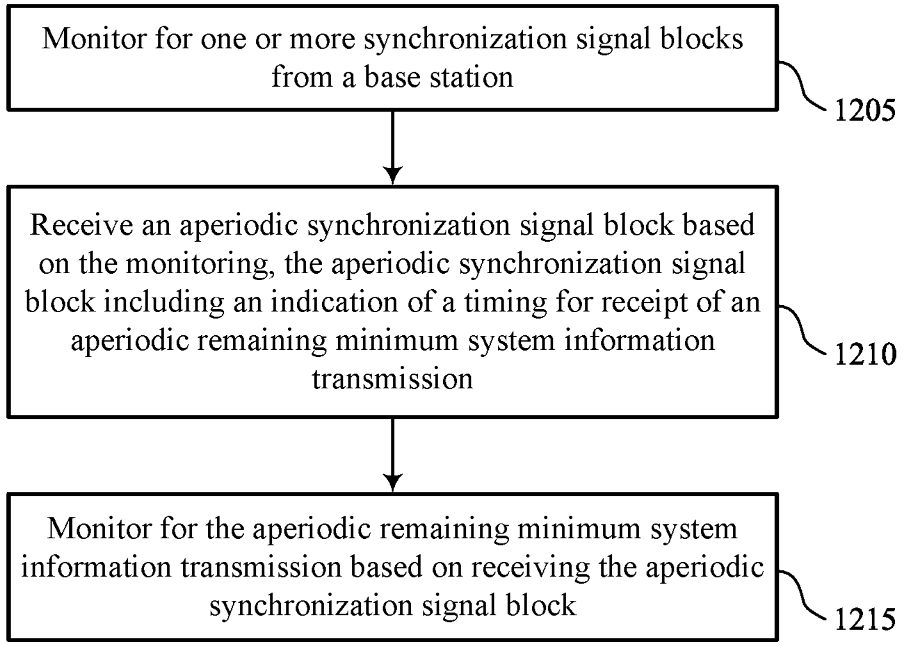
FIGS. 12 through 15 show flowcharts illustrating methods that support aperiodic signal transmission for initial access in accordance with aspects of the present disclosure.

FIG. 12 shows a flowchart illustrating a method 1200 that supports aperiodic signal transmission for initial access in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include monitoring for one or more synchronization signal blocks from a base station. The operations of 1205 may be performed in accordance with examples as disclosed herein. In some examples, aspects of the operations of 1205 may be performed by a monitoring component 625 as described with reference to FIG. 6.

At 1210, the method may include receiving an aperiodic synchronization signal block based on the monitoring, the aperiodic synchronization signal block including an indication of a timing for receipt of an aperiodic remaining minimum system information transmission. The operations of 1210 may be performed in accordance with examples as disclosed herein. In some examples, aspects of the operations of 1210 may be performed by a synchronization signal block component 630 as described with reference to FIG. 6.

At 1215, the method may include monitoring for the aperiodic remaining minimum system information transmission based on receiving the aperiodic synchronization signal block. The operations of 1215 may be performed in accordance with examples as disclosed herein. In some examples, aspects of the operations of 1215 may be performed by a monitoring component 625 as described with reference to FIG. 6.

Figure 13:
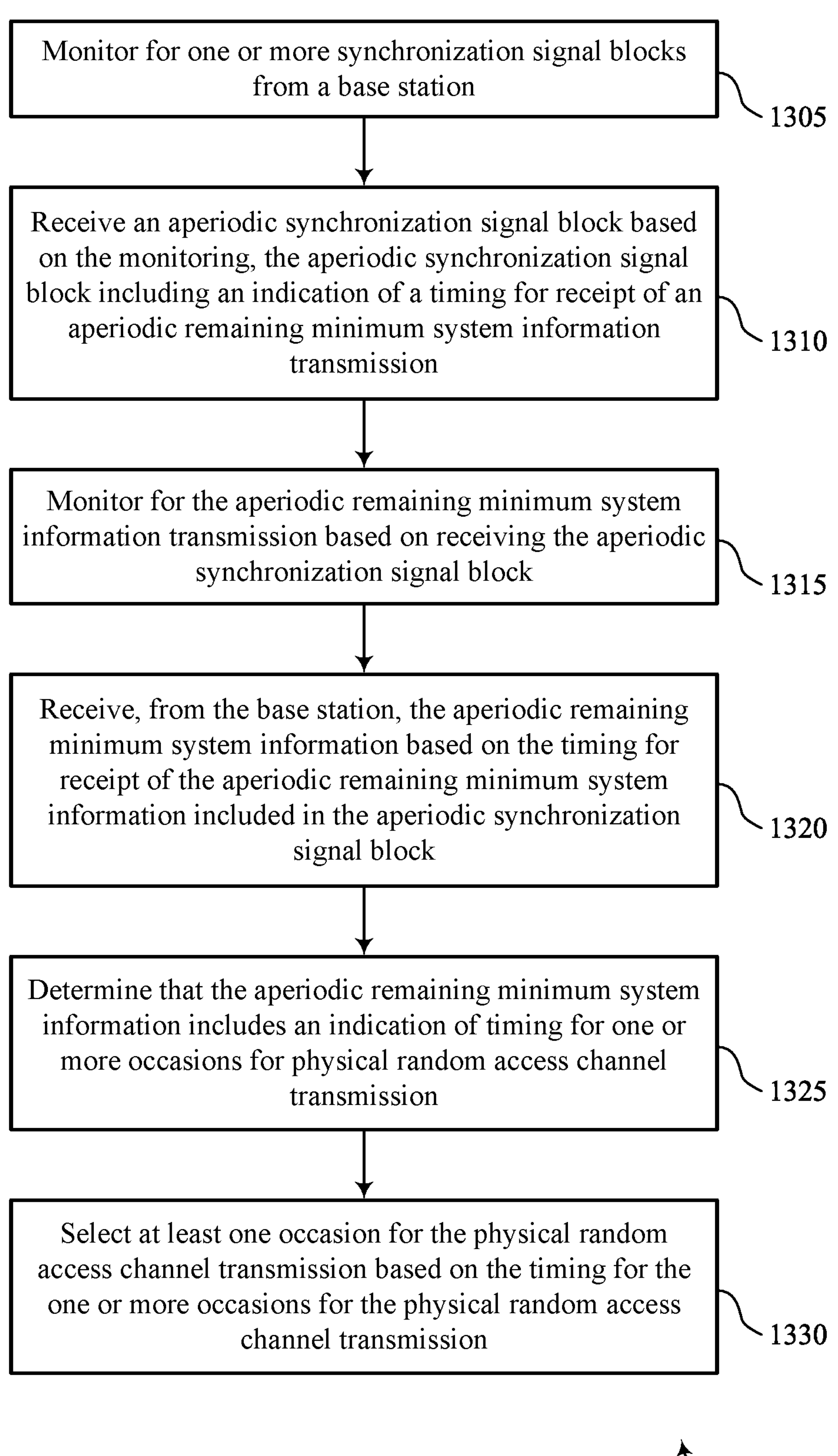

FIG. 13 shows a flowchart illustrating a method 1300 that supports aperiodic signal transmission for initial access in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include monitoring for one or more synchronization signal blocks from a base station. The operations of 1305 may be performed in accordance with examples as disclosed herein. In some examples, aspects of the operations of 1305 may be performed by a monitoring component 625 as described with reference to FIG. 6.

At 1310, the method may include receiving an aperiodic synchronization signal block based on the monitoring, the aperiodic synchronization signal block including an indication of a timing for receipt of an aperiodic remaining minimum system information transmission. The operations of 1310 may be performed in accordance with examples as disclosed herein. In some examples, aspects of the operations of 1310 may be performed by a synchronization signal block component 630 as described with reference to FIG. 6.

At 1315, the method may include monitoring for the aperiodic remaining minimum system information transmission based on receiving the aperiodic synchronization signal block. The operations of 1315 may be performed in accordance with examples as disclosed herein. In some examples, aspects of the operations of 1315 may be performed by a monitoring component 625 as described with reference to FIG. 6.

At 1320, the method may include receiving, from the base station, the aperiodic remaining minimum system information based on the timing for receipt of the aperiodic remaining minimum system information included in the aperiodic synchronization signal block. The operations of 1320 may be performed in accordance with examples as disclosed herein. In some examples, aspects of the operations of 1320 may be performed by a remaining system information component 635 as described with reference to FIG. 6.

At 1325, the method may include determining that the aperiodic remaining minimum system information includes an indication of timing for one or more occasions for physical random access channel transmission. The operations of 1325 may be performed in accordance with examples as disclosed herein. In some examples, aspects of the operations of 1325 may be performed by a remaining system information component 635 as described with reference to FIG. 6.

At 1330, the method may include selecting at least one occasion for the physical random access channel transmission based on the timing for the one or more occasions for the physical random access channel transmission. The operations of 1330 may be performed in accordance with examples as disclosed herein. In some examples, aspects of the operations of 1330 may be performed by a physical random access channel component 640 as described with reference to FIG. 6.

Figure 14:
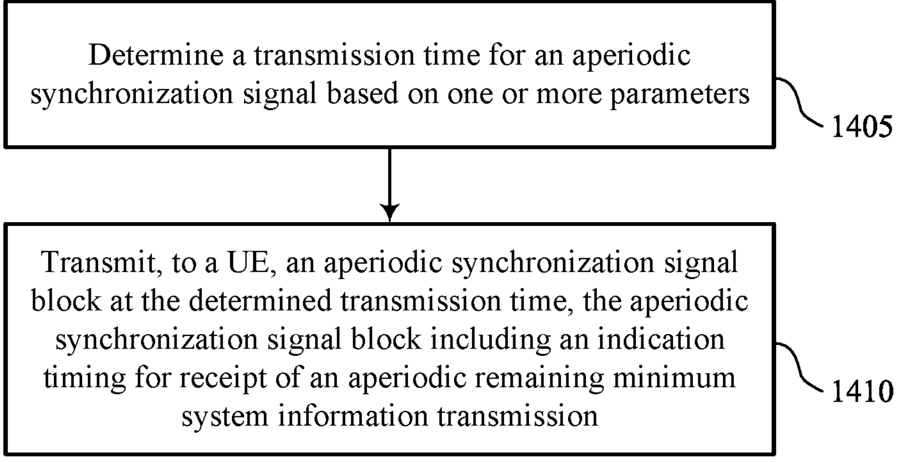

FIG. 14 shows a flowchart illustrating a method 1400 that supports aperiodic signal transmission for initial access in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include determining a transmission time for an aperiodic synchronization signal based on one or more parameters. The operations of 1405 may be performed in accordance with examples as disclosed herein. In some examples, aspects of the operations of 1405 may be performed by a synchronization signal block component 1025 as described with reference to FIG. 10.

At 1410, the method may include transmitting, to a UE, an aperiodic synchronization signal block at the determined transmission time, the aperiodic synchronization signal block including an indication timing for receipt of an aperiodic remaining minimum system information transmission. The operations of 1410 may be performed in accordance with examples as disclosed herein. In some examples, aspects of the operations of 1410 may be performed by a synchronization signal block component 1025 as described with reference to FIG. 10.

Figure 15:
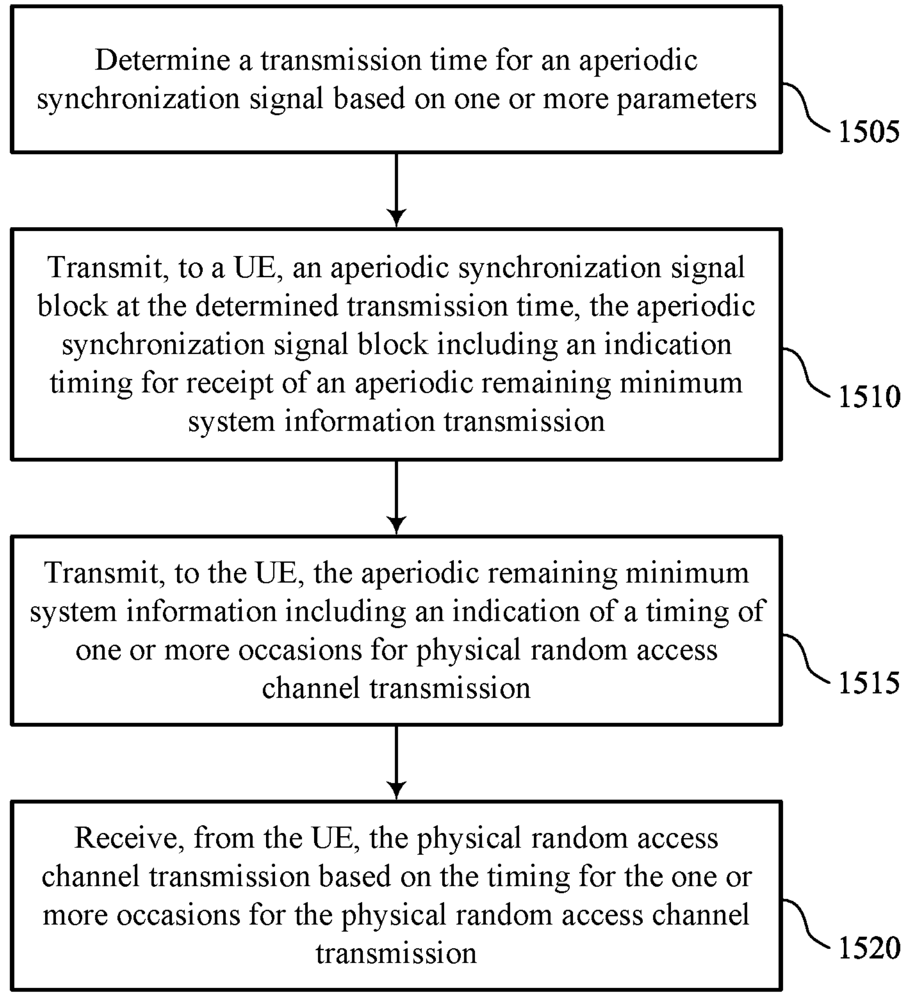

FIG. 15 shows a flowchart illustrating a method 1500 that supports aperiodic signal transmission for initial access in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include determining a transmission time for an aperiodic synchronization signal based on one or more parameters. The operations of 1505 may be performed in accordance with examples as disclosed herein. In some examples, aspects of the operations of 1505 may be performed by a synchronization signal block component 1025 as described with reference to FIG. 10.

At 1510, the method may include transmitting, to a UE, an aperiodic synchronization signal block at the determined transmission time, the aperiodic synchronization signal block including an indication timing for receipt of an aperiodic remaining minimum system information transmission. The operations of 1510 may be performed in accordance with examples as disclosed herein. In some examples, aspects of the operations of 1510 may be performed by a synchronization signal block component 1025 as described with reference to FIG. 10.

At 1515, the method may include transmitting, to the UE, the aperiodic remaining minimum system information including an indication of a timing of one or more occasions for physical random access channel transmission. The operations of 1515 may be performed in accordance with examples as disclosed herein. In some examples, aspects of the operations of 1515 may be performed by a remaining system information component 1030 as described with reference to FIG. 10.

At 1520, the method may include receiving, from the UE, the physical random access channel transmission based on the timing for the one or more occasions for the physical random access channel transmission. The operations of 1520 may be performed in accordance with examples as disclosed herein. In some examples, aspects of the operations of 1520 may be performed by a physical random access channel component 1035 as described with reference to FIG. 10.

The following provides an overview of aspects of the present disclosure:

Aspect 1: A method for wireless communication at a UE, comprising: monitoring for one or more synchronization signal blocks from a base station; receiving an aperiodic synchronization signal block based at least in part on the monitoring, the aperiodic synchronization signal block comprising an indication of a timing for receipt of an aperiodic remaining minimum system information transmission; and monitoring for the aperiodic remaining minimum system information transmission based at least in part on receiving the aperiodic synchronization signal block.

Aspect 2: The method of aspect 1, further comprising: receiving, from the base station, the aperiodic remaining minimum system information based at least in part on the timing for receipt of the aperiodic remaining minimum system information included in the aperiodic synchronization signal block; determining that the aperiodic remaining minimum system information comprises an indication of timing for one or more occasions for physical random access channel transmission; and selecting at least one occasion for the physical random access channel transmission based at least in part on the timing for the one or more occasions for the physical random access channel transmission.

Aspect 3: The method of any of aspects 1 through 2, further comprising: determining that the aperiodic synchronization signal block comprises location information for receipt of the aperiodic remaining minimum system information; and receiving the aperiodic remaining minimum system information based at least in part on the location information for receipt of the aperiodic remaining minimum system information.

Aspect 4: The method of aspect 3, wherein the location information indicates a location for receiving the aperiodic remaining minimum system information with respect to a timing for receipt of the aperiodic synchronization signal block.

Aspect 5: The method of any of aspects 1 through 4, further comprising: receiving a second aperiodic synchronization signal block based at least in part on the monitoring; determining that the second aperiodic synchronization signal block lacks timing information for reception of a second aperiodic remaining minimum system information; and refraining from performing a demodulation reference signal scrambling for the second aperiodic remaining minimum system information using the timing information based at least in part on the determining.

Aspect 6: The method of any of aspects 1 through 5, further comprising: determining that the aperiodic synchronization signal block comprises an indication of a first occasion for reception of the aperiodic remaining minimum system information and a second occasion for reception of a retransmission of the aperiodic remaining minimum system information, wherein the first occasion and the second occasion are indicated with respect to a timing for receipt of the aperiodic synchronization signal block; receiving the aperiodic remaining minimum system information based at least in part on the indication of the first occasion included in the aperiodic synchronization signal block; and receiving a retransmission of the aperiodic remaining minimum system information based at least in part on the indication of the second occasion included in the aperiodic synchronization signal block.

Aspect 7: The method of any of aspects 1 through 6, further comprising: determining that a physical downlink control channel or a physical downlink shared channel associated with the aperiodic remaining minimum system information is not received at the UE; monitoring for a second aperiodic synchronization signal block based at least in part on determining that the physical downlink control channel or the physical downlink shared channel associated with the aperiodic remaining minimum system information is not received at the UE; receiving the second aperiodic synchronization signal block comprising an indication of a timing for receipt of a second aperiodic remaining minimum system information; and receiving the second aperiodic remaining minimum system information based at least in part on the timing for receipt of the second aperiodic remaining minimum system information included in the second aperiodic synchronization signal block.

Aspect 8: The method of any of aspects 1 through 7, further comprising: receiving, from the base station, a plurality of aperiodic remaining minimum system information transmissions indicated by the aperiodic synchronization signal block, wherein the aperiodic synchronization signal block comprises an indication of timing for receipt of a plurality of aperiodic remaining minimum system information transmissions.

Aspect 9: The method of any of aspects 1 through 8, further comprising: determining that the aperiodic remaining minimum system information associated with a first beam indicates a second beam for selecting an occasion for a physical random access channel transmission; and selecting the occasion for the physical random access channel transmission based at least in part on the determining.

Aspect 10: The method of any of aspects 1 through 9, further comprising: receiving, from a base station, a type indication indicating the aperiodic synchronization signal block, wherein monitoring for the one or more synchronization signal blocks is based at least in part on the type indication.

Aspect 11: The method of aspect 10, wherein the type indication is transmitted in a physical broadcast channel transmission or a demodulation reference signal associated with the physical broadcast channel transmission.

Aspect 12: The method of any of aspects 1 through 11, wherein the UE uses the aperiodic synchronization signal block to perform an initial access operation.

Aspect 13: The method of any of aspects 1 through 12, wherein the aperiodic synchronization signal block comprises a cell defining synchronization signal block.

Aspect 14: The method of any of aspects 1 through 13, wherein the aperiodic synchronization signal block and a periodic synchronization signal block are associated with at least one of different synchronization rasters, different primary synchronization signal sets, different secondary synchronization signal sets, or a combination thereof.

Aspect 15: A method for wireless communication at a base station, comprising: determining a transmission time for an aperiodic synchronization signal based at least in part on one or more parameters; and transmitting, to a UE, an aperiodic synchronization signal block at the determined transmission time, the aperiodic synchronization signal block comprising an indication timing for receipt of an aperiodic remaining minimum system information transmission.

Aspect 16: The method of aspect 15, further comprising: transmitting, to the UE, the aperiodic remaining minimum system information comprising an indication of a timing of one or more occasions for physical random access channel transmission; and receiving, from the UE, the physical random access channel transmission based at least in part on the timing for the one or more occasions for the physical random access channel transmission.

Aspect 17: The method of any of aspects 15 through 16, further comprising: determining that the aperiodic synchronization signal block comprises location information for receipt of the aperiodic remaining minimum system information; and transmitting the aperiodic remaining minimum system information based at least in part on the location information for receipt of the aperiodic remaining minimum system information.

Aspect 18: The method of aspect 17, wherein the location information indicates a location for receiving the aperiodic remaining minimum system information with respect to a timing for receipt of the aperiodic synchronization signal block.

Aspect 19: The method of any of aspects 15 through 18, further comprising: determining that the aperiodic synchronization signal block comprises an indication of a first occasion for reception of the aperiodic remaining minimum system information and a second occasion for reception of a retransmission of the aperiodic remaining minimum system information, wherein the first occasion and the second occasion are indicated with respect to a timing for receipt of the aperiodic synchronization signal block; transmitting the aperiodic remaining minimum system information based at least in part on the indication of the first occasion included in the aperiodic synchronization signal block; and transmitting a retransmission of the aperiodic remaining minimum system information based at least in part on the indication of the second occasion included in the aperiodic synchronization signal block.

Aspect 20: The method of any of aspects 15 through 19, further comprising: transmitting, to the UE, a plurality of aperiodic remaining minimum system information transmissions indicated by the aperiodic synchronization signal block, wherein the aperiodic synchronization signal block comprises an indication of timing for receipt of a plurality of aperiodic remaining minimum system information transmissions.

Aspect 21: The method of any of aspects 15 through 20, further comprising: transmitting, to the UE, a type indication indicating the aperiodic synchronization signal block, wherein transmitting the aperiodic synchronization signal block is based at least in part on the type indication.

Aspect 22: The method of aspect 21, wherein the type indication is transmitted in a physical broadcast channel transmission or a demodulation reference signal associated with the physical broadcast channel transmission.

Aspect 23: The method of any of aspects 15 through 22, wherein the one or more parameters comprise an availability of resources or a traffic condition or both.

Aspect 24: The method of any of aspects 15 through 23, wherein the aperiodic synchronization signal block comprises a cell defining synchronization signal block.

Aspect 25: The method of any of aspects 15 through 24, wherein the aperiodic synchronization signal block and a periodic synchronization signal block are associated with at least one of different synchronization rasters, different primary synchronization signal sets, different secondary synchronization signal sets, or a combination thereof.

Aspect 26: An apparatus for wireless communication at a UE, comprising a processor; memory coupled with the processor; and instructions stored in the memory and executable by the processor to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication at a base station, comprising a processor; memory coupled with the processor; and instructions stored in the memory and executable by the processor to cause the apparatus to perform a method of any of aspects 15 through 25.

Aspect 30: An apparatus for wireless communication at a base station, comprising at least one means for performing a method of any of aspects 15 through 25.

Aspect 31: A non-transitory computer-readable medium storing code for wireless communication at a base station, the code comprising instructions executable by a processor to perform a method of any of aspects 15 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

monitoring for one or more synchronization signal blocks from a network device;

receiving a first aperiodic synchronization signal block based at least in part on the monitoring, the first aperiodic synchronization signal block comprising an indication of a timing of a first occasion corresponding to a receipt of a first aperiodic remaining minimum system information and a timing of a second occasion corresponding to a receipt of a retransmission of the first aperiodic remaining minimum system information; and monitoring for the first aperiodic remaining minimum system information during the first occasion or the retransmission of the first aperiodic remaining minimum system information during the second occasion, or both, based at least in part on receiving the first aperiodic synchronization signal block.

2. The method of claim 1, further comprising:

receiving, from the network device, the first aperiodic remaining minimum system information based at least in part on the timing of the first occasion;

determining that the first aperiodic remaining minimum system information comprises an indication of timing corresponding to one or more occasions for physical random access channel transmission; and selecting at least one occasion for the physical random access channel transmission based at least in part on the timing corresponding to the one or more occasions for the physical random access channel transmission.

3. The method of claim 1, further comprising:

determining that the first aperiodic synchronization signal block comprises location information corresponding to the receipt of the first aperiodic remaining minimum system information; and receiving the first aperiodic remaining minimum system information based at least in part on the location information corresponding to the receipt of the first aperiodic remaining minimum system information.

4. The method of claim 3, wherein the location information indicates a location for receiving the first aperiodic remaining minimum system information with respect to the timing of the first occasion.

5. The method of claim 1, further comprising:

receiving a second aperiodic synchronization signal block based at least in part on the monitoring;

determining that the second aperiodic synchronization signal block lacks timing information corresponding to reception of a second aperiodic remaining minimum system information; and refraining from performing a demodulation reference signal scrambling for the second aperiodic remaining minimum system information using the timing information based at least in part on the second aperiodic synchronization signal block lacking timing information corresponding to the reception of the second aperiodic remaining minimum system information.

6. The method of claim 1, further comprising:

receiving the first aperiodic remaining minimum system information based at least in part on the indication of the first occasion included in the first aperiodic synchronization signal block; and receiving the retransmission of the first aperiodic remaining minimum system information based at least in part on the indication of the second occasion included in the first aperiodic synchronization signal block.

7. The method of claim 1, further comprising:

determining that a physical downlink control channel or a physical downlink shared channel associated with the first aperiodic remaining minimum system information is not received at the UE;

monitoring for a third aperiodic synchronization signal block based at least in part on determining that the physical downlink control channel or the physical downlink shared channel associated with the first aperiodic remaining minimum system information is not received at the UE;

receiving the third aperiodic synchronization signal block comprising an indication of a timing corresponding to a receipt of a third aperiodic remaining minimum system information; and receiving the third aperiodic remaining minimum system information based at least in part on the timing corresponding to the receipt of the third aperiodic remaining minimum system information included in the third aperiodic synchronization signal block.

8. The method of claim 1, further comprising:

receiving, from the network device, a plurality of aperiodic remaining minimum system information transmissions indicated by the first aperiodic synchronization signal block, wherein the first aperiodic synchronization signal block comprises an indication of timing corresponding to a receipt of a plurality of aperiodic remaining minimum system information transmissions.

9. The method of claim 1, further comprising:

determining that the first aperiodic remaining minimum system information associated with a first beam indicates a second beam corresponding to selecting an occasion for a physical random access channel transmission; and selecting the occasion for the physical random access channel transmission based at least in part on the determining.

10. The method of claim 1, further comprising:

receiving, from the network device, a type indication indicating the first aperiodic synchronization signal block, wherein monitoring for the one or more synchronization signal blocks is based at least in part on the type indication.

11. The method of claim 10, wherein the type indication is transmitted in a physical broadcast channel transmission or a demodulation reference signal associated with the physical broadcast channel transmission.

12. The method of claim 1, wherein the UE uses the first aperiodic synchronization signal block to perform an initial access operation.

13. The method of claim 1, wherein the first aperiodic synchronization signal block comprises a cell defining synchronization signal block.

14. The method of claim 1, wherein the first aperiodic synchronization signal block and a periodic synchronization signal block are associated with at least one of different synchronization rasters, different primary synchronization signal sets, different secondary synchronization signal sets, or a combination thereof.

15. A method for wireless communication at a network device, comprising:

determining a transmission time for a first aperiodic synchronization signal block based at least in part on one or more parameters; and transmitting, to a user equipment (UE), the first aperiodic synchronization signal block at the determined transmission time, the first aperiodic synchronization signal block comprising an indication of a timing of a first occasion corresponding to a receipt of a first aperiodic remaining minimum system information and a timing of a second occasion corresponding to a receipt of a retransmission of the first aperiodic remaining minimum system information.

16. The method of claim 15, further comprising:

transmitting, to the UE, the first aperiodic remaining minimum system information comprising an indication of a timing of one or more occasions for physical random access channel transmission; and receiving, from the UE, the physical random access channel transmission based at least in part on the timing corresponding to the one or more occasions for the physical random access channel transmission.

17. The method of claim 15, further comprising:

determining that the first aperiodic synchronization signal block comprises location information corresponding to the receipt of the first aperiodic remaining minimum system information; and transmitting the first aperiodic remaining minimum system information based at least in part on the location information corresponding to the receipt of the first aperiodic remaining minimum system information.

18. The method of claim 17, wherein the location information indicates a location for the first aperiodic remaining minimum system information with respect to the timing corresponding to the receipt of the first aperiodic synchronization signal block.

19. The method of claim 15, further comprising:

transmitting the first aperiodic remaining minimum system information based at least in part on the indication of the first occasion included in the first aperiodic synchronization signal block; and transmitting the retransmission of the first aperiodic remaining minimum system information based at least in part on the indication of the second occasion included in the first aperiodic synchronization signal block.

20. The method of claim 15, further comprising:

transmitting, to the UE, a plurality of aperiodic remaining minimum system information transmissions indicated by the first aperiodic synchronization signal block, wherein the first aperiodic synchronization signal block comprises an indication of timing corresponding to a receipt of a plurality of aperiodic remaining minimum system information transmissions.

21. The method of claim 15, further comprising:

transmitting, to the UE, a type indication indicating the first aperiodic synchronization signal block, wherein transmitting the first aperiodic synchronization signal block is based at least in part on the type indication.

22. The method of claim 21, wherein the type indication is transmitted in a physical broadcast channel transmission or a demodulation reference signal associated with the physical broadcast channel transmission.

23. The method of claim 15, wherein the one or more parameters comprise an availability of resources or a traffic condition or both.

24. The method of claim 15, wherein the first aperiodic synchronization signal block comprises a cell defining synchronization signal block.

25. The method of claim 15, wherein the first aperiodic synchronization signal block and a periodic synchronization signal block are associated with at least one of different synchronization rasters, different primary synchronization signal sets, different secondary synchronization signal sets, or a combination thereof.

26. An apparatus for wireless communication at a user equipment (UE), comprising:

one or more processors;

one or more memories coupled with the one or more processors; and instructions stored in the one or more memories and executable by the one or more processors to cause the apparatus to:

monitor for one or more synchronization signal blocks from a network device;

receive a first aperiodic synchronization signal block based at least in part on the monitoring, the first aperiodic synchronization signal block comprising an indication of a timing of a first occasion corresponding to a receipt of a first aperiodic remaining minimum system information and a timing of a second occasion corresponding to a receipt of a retransmission of the first aperiodic remaining minimum system information; and monitor for the first aperiodic remaining minimum system information during the first occasion or the retransmission of the first aperiodic remaining minimum system information during the second occasion, or both, based at least in part on receiving the first aperiodic synchronization signal block.

27. The apparatus of claim 26, wherein the instructions are further executable by the one or more processors to cause the apparatus to:

receive, from the network device, the first aperiodic remaining minimum system information based at least in part on the timing of the first occasion;

determine that the first aperiodic remaining minimum system information comprises an indication of timing corresponding to one or more occasions for physical random access channel transmission; and select at least one occasion for the physical random access channel transmission based at least in part on the timing corresponding to the one or more occasions for the physical random access channel transmission.

28. The apparatus of claim 26, wherein the instructions are further executable by the one or more processors to cause the apparatus to:

determine that the first aperiodic synchronization signal block comprises location information corresponding to the receipt of the first aperiodic remaining minimum system information; and receive the first aperiodic remaining minimum system information based at least in part on the location information corresponding to the receipt of the first aperiodic remaining minimum system information.

29. The apparatus of claim 28, wherein the location information indicates a location for receiving the first aperiodic remaining minimum system information with respect to a timing corresponding to the receipt of the first aperiodic synchronization signal block.

30. An apparatus for wireless communication at a network device, comprising:

one or more processors;

one or more memories coupled with the one or more processors; and instructions stored in the one or more memories and executable by the one or more processors to cause the apparatus to:

determine a transmission time for a first aperiodic synchronization signal block based at least in part on one or more parameters; and transmit, to a user equipment (UE), the first aperiodic synchronization signal block at the determined transmission time, the first aperiodic synchronization signal block comprising an indication of a timing of a first occasion corresponding to a receipt of a first aperiodic remaining minimum system information and a timing of a second occasion corresponding to a receipt of a retransmission of the first aperiodic remaining minimum system information.

* * * * *